(12) United States Patent
Kurashige et al.

(10) Patent No.: US 10,837,617 B2
(45) Date of Patent: Nov. 17, 2020

(54) ILLUMINATION DEVICE

(71) Applicant: Dai Nippon Printing Co., Ltd., Tokyo (JP)

(72) Inventors: Makio Kurashige, Tokyo (JP); Shumpei Nishio, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 16/470,685

(22) PCT Filed: Dec. 26, 2017

(86) PCT No.: PCT/JP2017/046655
§ 371 (c)(1),
(2) Date: Jun. 18, 2019

(87) PCT Pub. No.: WO2018/124075
PCT Pub. Date: Jul. 5, 2018

(65) Prior Publication Data
US 2020/0088379 A1 Mar. 19, 2020

(30) Foreign Application Priority Data

Dec. 28, 2016 (JP) ................................. 2016-256538

(51) Int. Cl.
*F21S 43/20* (2018.01)
*F21V 14/06* (2006.01)
(Continued)

(52) U.S. Cl.
CPC .............. *F21S 43/26* (2018.01); *F21V 14/06* (2013.01); *G02B 5/1842* (2013.01); *G02B 5/32* (2013.01); *B60Q 1/50* (2013.01)

(58) Field of Classification Search
CPC .............. F21S 43/26; G02B 5/32; F21V 14/06
See application file for complete search history.

(56) References Cited

U.S. PATENT DOCUMENTS 3,650,605 A * 3/1972 Little, Jr. ................. G02B 5/32
359/15
5,798,864 A 8/1998 Sekiguichi
(Continued)

FOREIGN PATENT DOCUMENTS

JP 2014-101045 A1 6/2014
JP 2015-132707 A1 7/2015
(Continued)

OTHER PUBLICATIONS

English translation of International Preliminary Report on Patentability (Chapter I) (Application No. PCT/JP2017/046655) dated Jul. 11, 2019.
(Continued)

*Primary Examiner* — Evan P Dzierzynski
(74) *Attorney, Agent, or Firm* — Burr & Brown, PLLC

(57) ABSTRACT

The invention enables a desired projection pattern on a surface to be illuminated, and enables a projection position and/or a projection orientation of the projection pattern to be changed. A laser beam is shaped into a parallel light, and an incident surface of a diffraction optical element recording a hologram image is irradiated with the parallel light. A projection pattern of an arrow oriented in a predetermined direction is projected as a hologram reconstructed image on a surface to be illuminated. An optical-element drive unit rotates the diffraction optical element about a rotation axis in a rotation plane orthogonal to an optical axis of a parallel incident light. By means of the rotation, a geometric positional relationship of the diffraction optical element with respect to the surface to be illuminated is changed, whereby an orientation of the arrow projection pattern on the surface can be changed.

20 Claims, 11 Drawing Sheets

(51) Int. Cl.
    *G02B 5/18*     (2006.01)
    *G02B 5/32*     (2006.01)
    *B60Q 1/50*     (2006.01)

(56) References Cited

U.S. PATENT DOCUMENTS

| | | |
|---|---|---|
| 2003/0123159 A1 | 7/2003 | Morita et al. |
| 2004/0263977 A1* | 12/2004 | Toyoda ............ G03F 7/701 359/558 |
| 2006/0126184 A1* | 6/2006 | Kim ................. H04N 9/3161 359/599 |
| 2014/0232995 A1* | 8/2014 | Okamoto .......... G02B 27/0927 353/38 |
| 2017/0334341 A1 | 11/2017 | Kurashige et al. |

FOREIGN PATENT DOCUMENTS

| | | |
|---|---|---|
| JP | 2016-163295 A1 | 9/2016 |
| WO | 2016/072505 A1 | 5/2016 |

OTHER PUBLICATIONS

International Search Report and Written Opinion (Application No. PCT/JP2017/046655) dated Mar. 20, 2018.
Extended European Search Report (Application No. 17886371.8) dated Jul. 7, 2020, 11 pages.

* cited by examiner

ILLUMINATION DEVICE

FIELD OF THE INVENTION

The present invention relates to an illumination device. Particularly, the present invention relates to an illumination device that illuminates a predetermined surface to be illuminated by diffracting a light (light beam) from a light source by means of a diffraction optical element.

BACKGROUND ART

Recently, an illumination device having a function of forming a desired projection pattern on a surface to be illuminated, by means of a high-intensity light source such as a laser, has been practically used. A diffraction optical element such as a hologram has a function of diffracting and emitting an incident light in a desired direction. Thus, by diffracting a light from a light source in a desired direction by means of a diffraction optical element, a desired projection pattern can be formed on a surface to be illuminated.

For example, below Patent Document 1 discloses a technique wherein an illumination device having a function of diffracting a light emitted from a laser light source by a transmission-type hologram is installed on an automobile, so as to form a desired projection pattern formed of a hologram reconstructed image on a road surface. When information such as a character is recorded in a hologram in advance by using this technique, a reconstructed image such as a character can be displayed as a projection pattern on a road surface.

Patent Document 1: JP2015-132707A

SUMMARY OF THE INVENTION

As described above, the illumination device disclosed in Patent Document 1 can project a desired projection pattern on a surface to be illuminated such as a road surface, a floor surface, a wall surface, etc. Upon designing, a designer determines a shape of a projection pattern, a position at which the projection pattern is formed on the surface to be illuminated, and an orientation of the projection pattern. Namely, the designer determines in advance a surface to be illuminated which has a predetermined geometric positional relationship with respect to an illumination device, and designs diffraction properties of a diffraction optical element such that a projection pattern having a predetermined shape is formed in a predetermined orientation at a predetermined position of the surface to be illuminated.

For example, when a hologram is used as a diffraction optical element, an interference fringe, which allows a projection pattern having a predetermined shape to be reconstructed, as a hologram reconstructed image, in a predetermined orientation at a predetermined position of the surface to be illuminated, is recorded in the hologram. Thus, unless the hologram is replaced, the position and the orientation of the projection pattern projected on the surface to be illuminated are unchanged.

Meanwhile, as a new function of the aforementioned illumination device, it is desired that a position and an orientation of a projection pattern projected on a road surface or the like can be changed depending on circumstances. For example, when a projection pattern having an arrow shape is projected on a road surface in order to show a traveling direction of a vehicle, it is preferable that a position and an orientation of the arrow forming the projection pattern are changed in accordance with a traveling direction of the vehicle and/or a surrounding environment. However, a conventional illumination device cannot change a projection position and a projection orientation of a projection pattern.

Thus, the object of the present invention is to provide an illumination device which is capable of projecting a desired projection pattern on a surface to be illuminated, such as a road surface, a ground surface, a floor surface, a surface below water, and a wall surface, and is capable of changing a projection position and/or a projection orientation of the projection pattern.

(1) A first aspect of the present invention is:

an illumination device that projects a desired projection pattern on a surface to be illuminated, comprising:

a light source;

a diffraction optical element that diffracts a light from the light source and projects the projection pattern on the surface to be illuminated; and an optical-element drive unit that supports the diffraction optical element and drives the same;

wherein the optical-element drive unit determines a rotation axis orthogonal to a rotation plane including an incident surface of the diffraction optical element, and rotates the diffraction optical element about the rotation axis.

(2) A second aspect of the present invention is that, in the illumination device according to the aforementioned first aspect, the light source has a light emission unit that generates a light beam, and an optical shaping system that broadens the light beam to generate a parallel incident light, and causes the parallel incident light to be incident on the incident surface of the diffraction optical element.

(3) A third aspect of the present invention is that, in the illumination device according to the aforementioned second aspect, the diffraction optical element is disposed such that its incident surface is orthogonal to the parallel incident light; and the optical-element drive unit rotates the diffraction optical element in the rotation plane including the incident surface.

(4) A fourth aspect of the present invention is that, in the illumination device according to the aforementioned first to third aspects, when an XYZ three-dimensional coordinate system having an X axis, a Y axis and a Z axis orthogonal to one another is defined;

the light source generates the parallel incident light parallel to the X axis, and causes the parallel incident light to be incident on the incident surface of the diffraction optical element;

the diffraction optical element is formed of a hologram recording medium disposed to be parallel to a YZ plane, the hologram recording medium recording an interference fringe for generating a reconstructed image serving as the projection pattern on the surface to be illuminated parallel to an XY plane; and the optical-element drive unit rotates the diffraction optical element in the rotation plane parallel to the YZ plane.

(5) A fifth aspect of the present invention is the illumination device according to the aforementioned first to fourth aspects further comprising a device housing that accommodates the light source, the diffraction optical element and the optical-element drive unit, and fixedly supports the light source and the optical-element drive unit.

(6) A sixth aspect of the present invention is:

an illumination device that projects a desired projection pattern on a surface to be illuminated, comprising:

a light source;

a diffraction optical element that diffracts a light from the light source and projects the projection pattern on the surface to be illuminated;

an optical-element drive unit that supports the diffraction optical element and drives the same; and a light-source drive unit that supports the light source and drives the same;

wherein:

the optical-element drive unit changes an orientation of an incident surface of the diffraction optical element; and the light-source drive unit changes, in accordance with the change in orientation of the incident surface, an orientation of the light from the light source.

(7) A seventh aspect of the present invention is that, in the illumination device according to the aforementioned sixth aspect, the light-source drive unit changes the orientation of the light from the light source, such that an angle between an optical axis of an incident light that is incident on the diffraction optical element and a normal line to the incident surface of the diffraction optical element is kept unchanged.

(8) An eighth aspect of the present invention is that, in the illumination device according to the aforementioned sixth or seventh aspect, the light source has a light emission unit that generates a light beam, and an optical shaping system that broadens the light beam to generate a parallel incident light, and causes the parallel incident light to be incident on the incident surface of the diffraction optical element.

(9) A ninth aspect of the present invention is that, in the illumination device according to the aforementioned eighth aspect, the optical-element drive unit determines a rotation axis orthogonal to the parallel incident light, and rotates the diffraction optical element about the rotation axis.

(10) A tenth aspect of the present invention is the illumination device according to the aforementioned sixth to ninth aspects further comprising a device housing that accommodates the light source, the diffraction optical element, the optical-element drive unit and the light-source drive unit, and fixedly supports the optical-element drive unit and the light-source drive unit.

(11) An eleventh aspect of the present invention is that, in the illumination device according to the aforementioned sixth to ninth aspects, when a direction orthogonal to the surface to be illuminated is defined as a vertical direction;

the optical-element drive unit rotates the diffraction optical element such that a normal line that is normal to its incident surface is displaced in the vertical direction.

(12) A twelfth aspect of the present invention is that, in the illumination device according to the aforementioned sixth to ninth aspects, when an XYZ three-dimensional coordinate system having an X axis, a Y axis and a Z axis orthogonal to one another is defined, and a state in which the incident surface of the diffraction optical element is disposed to be parallel to a YZ plane is defined as a standard state;

in the standard state, the light source generates the parallel incident light parallel to the X axis, and causes the parallel incident light to be incident on the incident surface;

the diffraction optical element is formed of a hologram recording medium, the hologram recording medium recording an interference fringe for generating a reconstructed image serving as the projection pattern on the surface to be illuminated parallel to an XY plane; and the optical-element drive unit rotates the diffraction optical element about a rotation axis parallel to the Y axis.

(13) A thirteenth aspect of the preset invention is that, in the illumination device according to the aforementioned twelfth aspect, the light-source drive unit changes an orientation of the light from the light source along a plane parallel to an XZ plane.

(24) A fourteenth aspect of the present invention is that, in the illumination device according to the aforementioned sixth to tenth aspects, when a direction parallel to the surface to be illuminated is defined as a horizontal direction, the optical-element drive unit rotates the diffraction optical element such that a normal line that is normal to its incident surface is displaced in the horizontal direction.

(15) A fifteenth aspect of the present invention is that, in the illumination device according to the aforementioned sixth to tenth aspects, when an XYZ three-dimensional coordinate system having an X axis, a Y axis and a Z axis orthogonal to one another is defined, and a state in which the incident surface of the diffraction optical element is disposed to be parallel to a YZ plane is defined as a standard state;

in the standard state, the light source generates the parallel incident light parallel to the X axis, and causes the parallel incident light to be incident on the incident surface;

the diffraction optical element is formed of a hologram recording medium, the hologram recording medium recording an interference fringe for generating a reconstructed image serving as the projection pattern on the surface to be illuminated parallel to an XY plane; and the optical-element drive unit rotates the diffraction optical element about a rotation axis parallel to the Z axis.

(16) A sixteenth aspect of the present invention is that, in the illumination device according to the aforementioned fifteenth aspect, the light-source drive unit changes an orientation of the light from the light source along a plane parallel to the XY plane.

(17) A seventeenth aspect of the present invention is that, in the illumination device according to the aforementioned sixth to tenth aspects, the optical-element drive unit changes an orientation of the incident surface of the diffraction optical element, and the optical-element drive unit determines a rotation axis orthogonal to the rotation plane including the incident surface of the diffraction optical element, and rotates the diffraction optical element about the rotation axis.

(18) An eighteenth aspect of the present invention is:

an illumination device that projects a desired projection pattern on a surface to be illuminated, comprising:

a light source;

a diffraction optical element that diffracts a light from the light source and projects the projection pattern on the surface to be illuminated;

a device housing that accommodates the light source and the diffraction optical element; and a device-housing drive unit that installs the device housing at a predetermined installation position, and drives the device housing such that a position or an orientation, or both of the device housing with respect to the installation location is/are changed.

(19) A nineteenth aspect of the present invention is that, in the illumination device according to the aforementioned first to fifth, ninth and eleventh to seventeenth aspects, a rotation axis is disposed at a position inside the diffraction optical element or at a position passing through a surface thereof.

(20) A twentieth aspect of the present invention is that, in the illumination device according to the aforementioned second or eighth aspect, the optical shaping system has a magnifying lens that refracts and broadens the light beam generated by the light emission unit and a collimation lens that shapes the light from the magnifying lens into the parallel incident light, and causes the parallel incident light to be incident on the incident surface of the diffraction optical element.

According to the illumination device of the present invention, it is possible to project a desired projection pattern on a surface to be illuminated, such as a road surface, a ground surface, a floor surface, a surface below water, and a wall surface, and further to change a projection position and/or a projection orientation of the projection pattern.

DETAILED DESCRIPTION OF THE INVENTION

Figure 1:
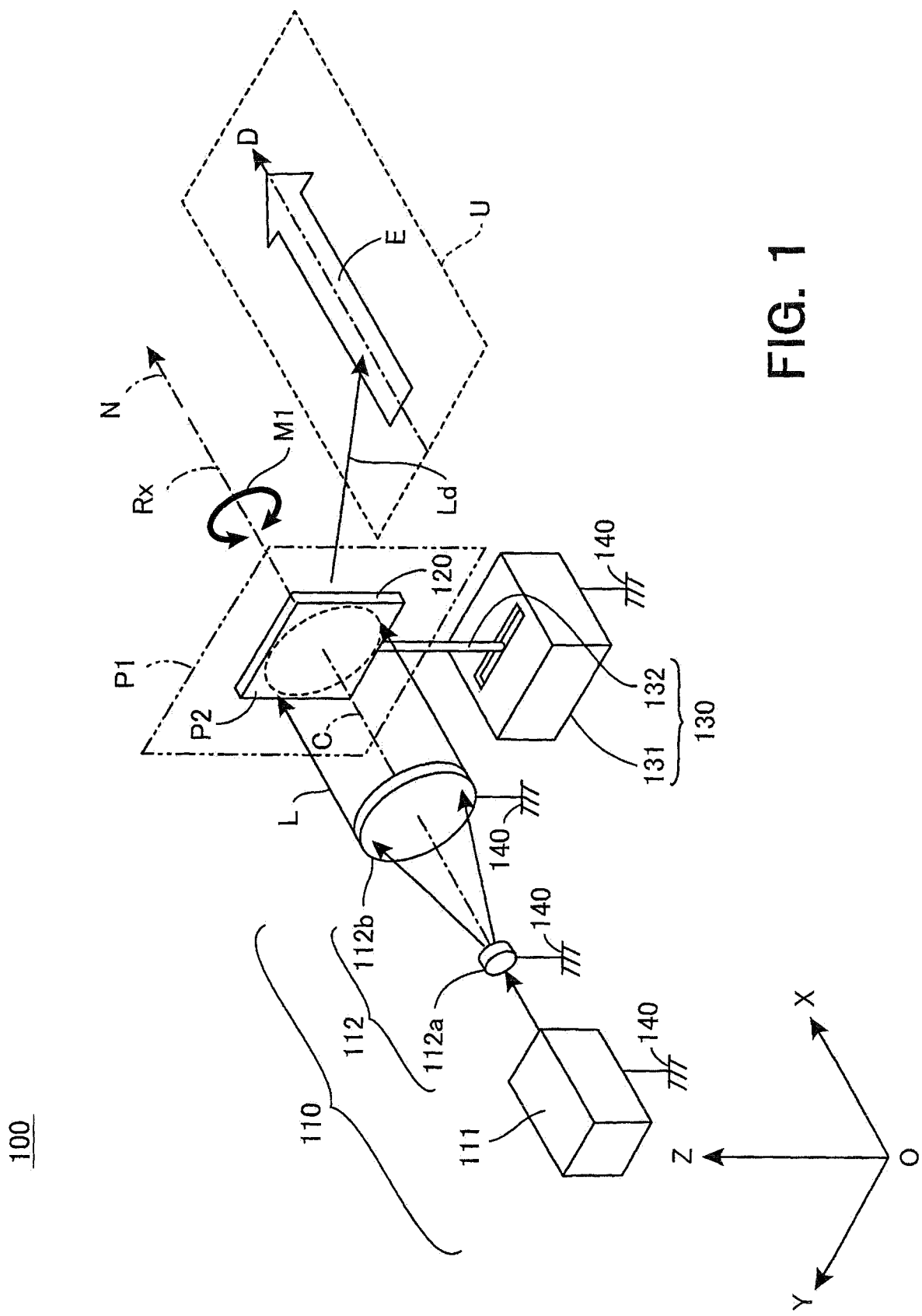
FIG. 1 is a perspective view showing an overall structure of an illumination device 100 according to a first embodiment of the present invention.

The present invention is described herebelow based on some illustrated embodiments. In the drawings attached to the specification, a scale size, an aspect ratio and so on are changed and exaggerated from the actual ones, for the convenience of easiness in illustration and understanding. In addition, terms specifying shapes and geometric conditions, e.g., "parallel", "orthogonal", "same", etc. and a value of a length, an angle, etc., are not limited to their strict definitions, but are to be construed to include a range capable of exerting a similar function.

§ 1. First Embodiment

A first embodiment of the present invention is firstly described with reference to FIGS. 1 to 4. FIG. 1 is a perspective view showing an overall structure of an illumination device 100 according to the first embodiment of the present invention. The illumination device 100 is an illumination device having a function of projecting a desired projection pattern E on a predetermined surface to be illuminated U. The surface to be illuminated U is a planar surface forming an area to be illuminated by the illumination device 100. In FIG. 1, the surface to be illuminated U is shown as a rectangular area surrounded by broken lines for the sake of convenience. In the illustrated example, the projection pattern E is a graphic pattern of an arrow graphic that is oriented in a direction D. However, it goes without saying that a shape and a size of the projection pattern E are not limited to the illustrated example, and the projection pattern E may have any optional shape. For example, the projection pattern E may have a linear shape or a shape of a specific character (this applies to the respective embodiments described later).

For example, the illumination device 100 can be used by installing it on a vehicle such as an automobile and an aircraft. When the illumination device 100 is used by installing it on a vehicle, information like a traveling direction of the vehicle can be displayed as a projection pattern E on a surrounding surface to be illuminated such as a road surface, a ground surface, a floor surface, a surface below water, and a wall surface. Described herein is an example in which the illumination device 100 is installed on an automobile, and a forward ground surface is illuminated such that a projection pattern E of an arrow graphic showing its traveling direction is formed thereon. Thus, in the illustrated example, the surface to be illuminated U is set as a road surface in front of the automobile.

As illustrated, the illumination device 100 comprises a light source 110, a diffraction optical element 120 that diffracts a light (light beam) L from the light source 110 and projects a projection pattern E on a surface to be illuminated U (on a forward road surface in this example), and an optical-element drive unit 130 that supports the diffraction optical element 120 and drives the same.

Although not shown, the illumination device 100 further comprises a device housing 140. The device housing 140 is a housing that accommodates the light source 110, the diffraction optical element 120 and the optical-element drive unit 130. In the illustrated example, the device housing 140 is installed on a front part of the automobile. The device housing 140 also serves a function of fixedly supporting the light source 110 and the optical-element drive unit 130.

In FIG. 1, in order to clearly show the fixedly supporting function, discrete parts of the device housing 140 are shown by using ground symbols of an electric circuit. Specifically, lines extending downward from discrete constituent elements 111, 112a, 112b of the light source 110 and the optical-element drive unit 130, and ground symbols 140 shown on lower ends of the lines show that these respective constituent elements are fixedly supported by the device housing 140. As described below, the diffraction optical element 120 is supported by the optical-element drive unit 130 so as to be movable with respect to the device housing 140.

Herein, for the convenience of describing a geometric positional relationship among the respective constituent elements that constitute the illumination device 100, an XYZ three-dimensional orthogonal coordinate system is defined as shown in the figure. In the illustrated example, the illumination device 100 is installed on the automobile such that its traveling direction corresponds to an X-axis plus direction, and the surface to be illuminated U (forward road surface) is defined on a plane parallel to an XY plane. In order to illuminate the surface to be illuminated U, the light source 110 has a function of emitting an illumination light in the X-axis plus direction.

The light source 110 has a light emission unit 111 that generates a light beam, and an optical shaping system 112 that broadens the light beam to generate a parallel incident light L. The light source 110 has a function of causing the parallel incident light L to be incident on an incident surface P2 of the diffraction optical element 120 disposed along a plane P1. In the illustrated example, an incident area in the incident surface P2 on which the parallel incident light L is incident is a circular area shown by broken lines.

As described above, the respective elements constituting the light source 110 are fixed to the device housing 140. In this example, a laser light emission unit is used as the light emission unit 111. A laser light emitted from the laser light emission unit 111 has excellent straightness and thus is suited as a light for illuminating the surface to be illuminated U to form the fine projection pattern E.

A laser light emitted from the light emission unit 111 is shaped by the optical shaping system 112 into a parallel incident light L. The optical shaping system 112 is disposed on a position along an optical path extending from the light emission unit 111 up to the diffraction optical element 120, i.e., between the light emission unit 111 and the diffraction optical element 120, so as to shape the laser light emitted from the light emission unit 111. To be specific, the optical shaping system 112 shapes a shape of the laser light in a cross-section orthogonal to an optical axis, and a three-dimensional shape of a luminous flux of the laser light, so as to generate a parallel incident light L.

In the illustrated example, the optical shaping system 112 has a magnifying lens 112a and a collimation lens 112b (both are fixed to the device housing 140), in this order along the optical path of the laser light. The magnifying lens 112a has a function of refracting and broadening a light beam generated by the light emission unit 111. The collimation lens 112b has a function of shaping a divergent luminous flux from the magnifying lens 112 into a parallel incident light L of a parallel luminous flux. The thus shaped parallel incident light L is incident on the incident surface P2 of the diffraction optical element 120.

The laser light emitted from the light emission unit 111 and incident on the optical shaping system 112 is firstly broadened by the magnifying lens 112a. Namely, the magnifying lens 112a diverges the laser light into a divergent luminous flux such that an area occupied by the light spreads in a cross-section orthogonal to the optical axis of the laser light. Following thereto, the divergent luminous flux is converted by the collimation lens 112b into a parallel luminous flux. The laser light shaped by the conversion is incident as the parallel incident light L on the diffraction optical element 120. In this example, the parallel incident light L is a parallel luminous flux moving in the X-axis plus direction. Herein, a center axis of the parallel luminous flux is referred to as an optical axis C (shown by one-dot chain lines in the drawings) of the parallel incident light L (in this patent application, "an optical axis of an incident light that is incident on a diffraction optical element" means a direction axis along an optical path that follows the center of an area through which a light or a luminous flux incident on the diffraction optical element passes).

Next, the diffraction optical element 120 is described. The diffraction optical element 120 has a function of diffracting the parallel incident light L from the light source 110, and projecting the desired projection pattern E by means of the obtained diffracted light Ld on the surface to be illuminated U. When the parallel incident light L (laser light) is caused to be incident on the incident surface P2 of the diffraction optical element 120 from a certain direction, the incident light can be efficiently diffracted in a desired direction, and the projection pattern E can be formed by the diffracted light Ld at a predetermined position.

In this example, the diffraction optical element 120 is formed of a hologram recording medium that records an interference fringe corresponding to a center wavelength of the laser light emitted from the light emission unit 111. The hologram recording medium records an interference fringe for generating a reconstructed image serving as the projection pattern E (an arrow graphic oriented in the direction D) on the surface to be illuminated U (on the forward road surface). By variously adjusting an interference fringe pattern to be recorded, a traveling direction of the diffracted light Ld that is diffracted by the diffraction optical element 120, i.e., a traveling direction of the light Ld that is diffused by the diffraction optical element 120 can be controlled, whereby the desired projection pattern E can be formed.

A geometric positional relationship between the diffraction optical element 120 and the surface to be illuminated U depends on a position on which the device housing 140 is installed on the automobile and a position at which the projection pattern E is designed to be projected. For example, suppose that the device housing 140 is installed to face a traveling direction on a front grill of the automobile at a height position of 80 cm from the road surface, and that the projection pattern E is designed to be projected on the road surface at a 80 m position ahead of the automobile. In this case, since a geometric positional relationship between the diffraction optical element 120 and the surface to be illuminated U can be defined based on the above design information, an interference fringe enabling that the desired projection pattern E can be obtained as a reconstructed image on the surface to be illuminated U having such a geometric positional relationship is recoded in the diffraction optical element 120. Thus, the surface to be illuminated U is illuminated with the diffracted light from the diffraction optical element 120, and the projection pattern E is formed as the illumination pattern on the road surface.

For example, the diffraction optical element 120 can be produced by using, as an object light, a scattered light from an actual scattering plate. To be specific, when a hologram photosensitive material, which is a matrix of the diffraction optical element 120, is irradiated with a object light, which is a coherent light, and an reference light interfering with each other, an interference fringe by coherence of the lights is formed in the hologram photosensitive material, so that the diffraction optical element 120 is produced. As an object light, a scattered light scattered from an economically available isotropic scattering plate is used, and as a reference light, laser light which is coherent light is used, as for example.

For example, when the projection pattern E of the arrow graphic shown in FIG. 1 is generated as a reconstructed image, an actual isotropic scattering plate having a shape of the arrow graphic is prepared, and an interference fringe is recorded by irradiating a hologram photosensitive material with a light as an object light which is obtained when the isotropic scattering plate is irradiated with the laser beam, and a laser light having the same wavelength as a reference light.

By using the hologram recording medium recording the interference fringe as the diffraction optical elements 120, and by projecting a laser light toward the diffraction optical element 40 such that the laser light travels conversely to an optical path of the reference light used upon recording, a reconstructed image of the scattering plate is generated at a position on which the scattering plate, which originated the object light used when the diffraction optical element 120 was produced, is located. When the scattering plate, which originated the object light used when the diffraction optical element 120 was produced, has uniform planar scattering properties, the reconstructed image of the scattering plate, which is generated by the diffraction optical element 120, is also a uniform planar illumination area. An area in which the reconstructed image of the scattering plate is generated can be the projection pattern E.

Instead of being formed by using a real object light and a real reference light, a complicated interference fringe pattern formed on a diffraction optical element 120 can be designed by using a computer based on a wavelength and an incident direction of expected illumination light to be reconstructed as well as a shape and a position of an image to be reconstructed. The diffraction optical element 120 thus obtained is also referred to as computer generated hologram (CGH). For example, as in the aforementioned example, when it is designed that the projection pattern E is projected on a road surface at a 80 m position ahead of the automobile, it is necessary to perform a recording with an object light from a scattering plate as far as 80 m, which is practically of great difficulty. In this case, a computer generated hologram is preferably used as the diffraction optical element 120.

When a computer generated hologram is used, for example, a Fourier conversion hologram in which respective points on the diffraction optical element 120 have the same diffusion angle properties may be generated by a computer. Further, an optical member such as a lens may be disposed on the downstream side (the side from which the diffracted light Ld is emitted) of the diffraction optical element 120, in order that the overall area of the projection pattern E is illuminated with a totally diffracted light Ld from the diffraction optical element 120.

Specifically, the diffraction optical element 120 may be a volume type hologram recording medium using a photopolymer, a volume type hologram recording medium that uses a photosensitive medium containing a silver salt material for recording, or a relief type (emboss type) hologram recording medium. A relief type hologram may be made of materials such as resin, glass, metal and organic/inorganic hybrid material. In addition, the diffraction optical element 120 may be of a transmission type or of a reflection type. In the illustrated example, a transmission type diffraction optical element 120 is used. On the other hand, when a reflection type diffraction optical element 120 is used, the light source 110 has to be disposed on the side opposed to the diffraction optical element 120.

A luminous flux emitted from such a diffraction optical element 120 has an outline corresponding to the pattern recorded in the diffraction optical element 120. Thus, the projection pattern E having an outline corresponding to the interference fringe recorded in the diffraction optical element 120 is formed on the surface to be illuminated U that is illuminated with such a luminous flux.

The feature of the present invention is to add, to the illumination device having a function of projecting the desired projection pattern E on the predetermined surface to be illuminated U, a function of changing a projection position and a projection orientation of the projection pattern E. For example, in the illustrated example, the illumination device is installed on an automobile. In this case, it is convenient that a projection position and/or a projection orientation of the projection pattern E on the road surface can be changed in accordance with a traveling direction of the automobile and a surrounding environment. In consideration of such circumferences, the illumination device 100 according to the first embodiment shown in FIG. 1 additionally has a function of changing a traveling direction of a luminous flux of the diffracted light Ld emitted from the diffraction optical element 120. As a result, the orientation of the projection pattern E can be changed.

To be specific, the illumination device 100 has the optical-element drive unit 130. The optical-element drive unit 130 has a function of rotating the diffraction optical element 120 about a predetermined rotation axis Rx that is orthogonal to the rotation plane P1 including the incident surface P2 of the diffraction optical element 120. In the illustrated example, the rotation plane P1 is set as a plane parallel to the YZ plane, and the diffraction optical element 120 is disposed such that its incident surface (light receiving surface) P2 is a plane included in the rotation plane P1.

Thus, the incident surface P2 of the diffraction optical element 120 is also a plane that is parallel to the YZ plane. On the other hand, as described above, the parallel incident light L is a parallel luminous flux moving in the X-axis plus direction. Thus, in this example, the parallel incident light L is a parallel luminous flux that is orthogonal to the incident surface P2 so as to be incident on the incident surface P2 from a direction perpendicular thereto. In other words, as shown, when a normal line N that is normal to the incident surface P2 is defined, the optical axis C of the parallel incident light L is parallel to the normal line N. In addition, the rotation axis Rx is parallel to the normal line N. In the illustrated example, since the normal line N and the rotation axis Rx are defined at a position of the optical axis C of the parallel incident light L, the optical axis C, the normal line N and the rotation axis Rx are defined on the same axis.

As shown, the optical-element drive unit 130 has a drive mechanism 131 and a support arm 132, and has a function of supporting the diffraction optical element 120 and rotating the diffraction optical element 120 about the rotation axis Rx in a direction shown by a rotation direction M1. Namely, the drive mechanism 131 has a function of swinging the support arm 132 about the rotation axis Rx. As such a drive mechanism 131, a mechanism for rotating the diffraction optical element 120 with the use of a motor and gears can be employed. Since such a mechanism can be produced by using a known mechanism such as a goniometer, detailed description thereof is omitted here.

The optical-element drive unit 130 serves a function of rotating the diffraction optical element 120 about a predetermined rotation axis (in this example, the optical axis C of the incident light), and the diffraction optical element 120 is rotated in the direction shown by the arrow M1 in the rotation plane P1 including the incident surface P2 (a plane orthogonal to the optical axis C of the incident light).

In order to reduce a size of the diffraction optical element 120, the rotation axis Rx is preferably parallel to the optical axis C of the incident light that is incident on the diffraction optical element 120. In addition, it is preferable that the rotation axis Rx is determined such that, during the rotating movement of the diffraction optical element 120, the incident area of the light from the light source 110 is not changed. In other words, the optical-element drive unit 130 is preferably configured to rotate the diffraction optical element 120 such that the light from the light source 110 is incident on the same area of the diffraction optical element 120. In the illustrated example, the rotation axis Rx is coincident with the optical axis C of the parallel incident light L that is incident on the diffraction optical element 120. Thus, since the light incident area in the diffraction optical element 120 does not largely change, the diffraction optical element 120 can be reduced in size.

Figure 2:
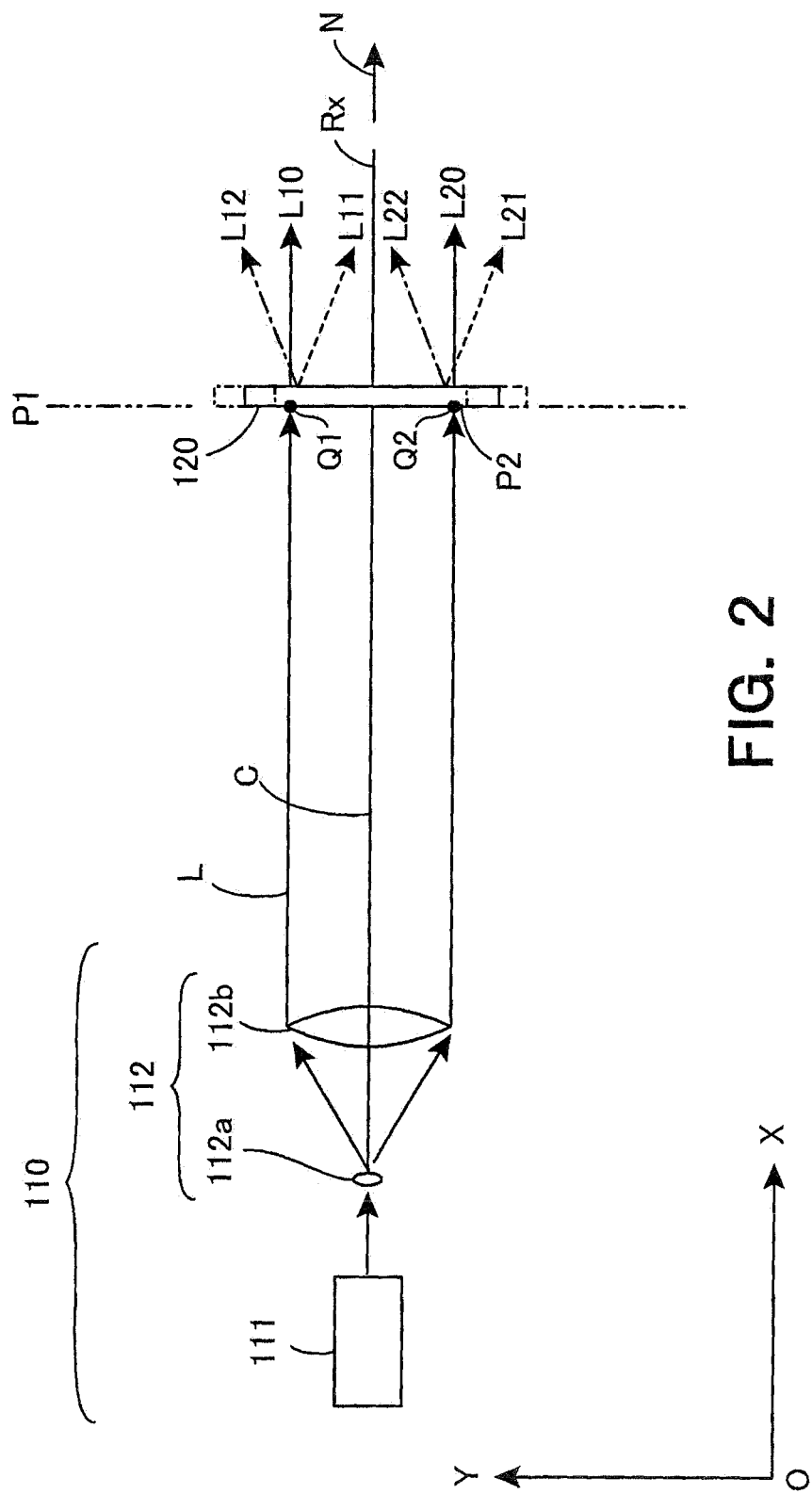
FIG. 2 is a top view of the illumination device 100 shown in FIG. 1 (illustration of some constituent elements is omitted).

The diffraction optical element 120 driven by the optical-element drive unit 130 changes a traveling direction of a luminous flux of the diffracted light Ld in accordance with a rotation direction and a rotation amount thereof. FIG. 2 is a top view of the illumination device 100 shown in FIG. 1 (illustration of some constituent elements is omitted). As shown by solid lines, a laser light emitted from the light emission unit 111 in the X-axis plus direction is shaped into a parallel incident light L parallel to the X axis, by means of the optical shaping system 112 having the magnifying lens 112a and the collimation lens 112b. The optical axis C shown by the solid line in FIG. 2 corresponds to a center axis of the luminous flux forming the parallel incident light L. In the illustrated example, the optical axis C is an axis passing through a center point of the planar diffraction optical element 120, and is coincident with the rotation axis Rx and the normal line N.

The diffraction optical element 120 shown by the solid line in FIG. 2 shows a position of an upper end surface of the diffraction optical element 120 in a standard state. Points Q1 and Q2 show incident positions of light beams at an outline position of the luminous flux forming the parallel incident light L on the incident surface P2 in the standard state. In addition, in FIG. 2, arrows L10 and L20 shown by solid lines on the right side of the diffraction optical element 120 show diffracted lights based on the lights incident on the points Q1 and Q2.

On the other hand, the diffraction optical element 120 shown by broken lines shows a position of the upper end surface of the diffraction optical element 120 in a first rotation state. The first rotation state is a state in which the diffraction optical element 120 is driven by the optical-element drive unit 130 so as to be rotated, in the rotation plane P1 including the incident surface P2, in a predetermined orientation by a predetermined amount. The positions of the points Q1 and Q2 in the standard state are somewhat displaced by this rotating movement. In FIG. 2, arrows L11 and L21 shown by broken lines on the right side of the diffraction optical element 120 show diffracted lights based on the lights incident on the displaced points Q1 and Q2. As shown, the diffracted lights L11 and L21 in the first rotation state somewhat differ in orientation from the diffracted lights L10 and L20 in the standard state.

Similarly, the diffraction optical element 120 shown by one-dot chain lines shows a position of an upper end surface of the diffraction optical element 120 in a second rotation state. The second rotation state is a state in which the diffraction optical element 120 is driven by the optical-element drive unit 130 so as to be rotated, in the rotation plane P1 including the incident surface P2, in a direction reverse to that of the aforementioned first rotation state by a predetermined amount. The positions of the points Q1 and Q2 in the standard state are somewhat displaced by this rotating movement. In FIG. 2, arrows L12 and L22 shown by one-dot chain lines on the right side of the diffraction optical element 120 show diffracted lights based on the lights incident on the displaced points Q1 and Q2. As shown in the figure, the diffracted lights L12 and L22 in the second rotation state also somewhat differ in orientation from the diffracted lights L10 and L20 in the standard state.

Although the incident surface P2 is irradiated with the same parallel incident light L, when the diffraction optical element 120 is rotated about the rotation axis Rx, relative positions of the predetermined points Q1 and Q2 with respect to the surface to be illuminated U, and an orientation of the interference fringe formed near the predetermined points Q1 and Q2 are changed. Thus, the orientations of the diffracted lights emitted from the points Q1 and Q2 are changed. Note that the diffracted lights L10 to L22 shown in FIG. 2 are drawn for the convenience of describing the change in orientation, and do not show diffracted lights for forming the arrow graphic projection pattern E shown in FIG. 1.

Figure 3:
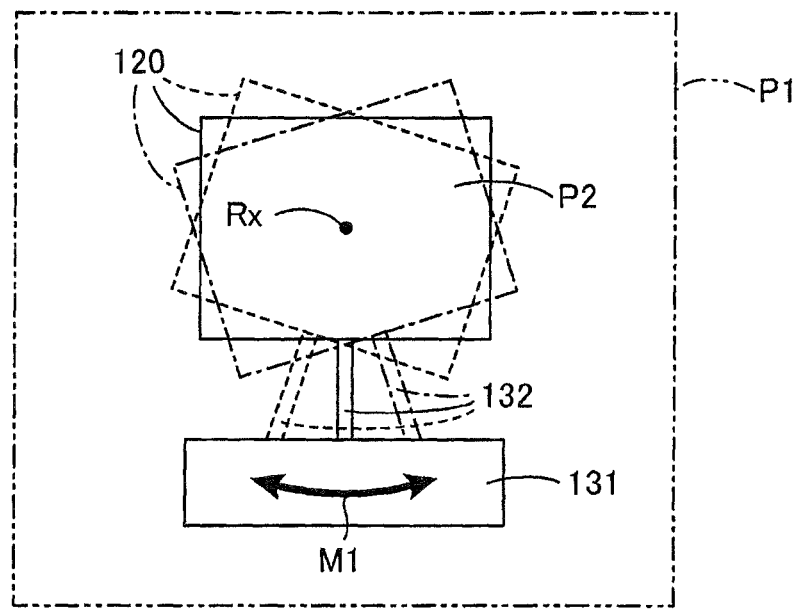
FIG. 3 is a front view showing a rotation state of a diffraction optical element 120 shown in FIG. 1.

FIG. 3 is a front view showing a rotation state of the diffraction optical element 120 shown in FIG. 1. As described above, the drive mechanism 131 drives the support arm 132 such that the incident surface P2 of the diffraction optical element 120 is rotated about the rotation axis Rx in the rotation plane P1 including the incident surface P2. As a result, the diffraction optical element 120 is rotated in the rotation direction shown by the arrow M1. Solid lines show the positions of the diffraction optical element 120 and the support arm 132 in the standard state, broken lines show the positions of the diffraction optical element 120 and the support arm 132 in the first rotation state, and one-dot chain lines show the positions of the diffraction optical element 120 and the support arm 132 in the second rotation state.

Namely, the drive mechanism 131 can rotate the diffraction optical element 120 in a given direction by a given amount, and can stop the rotating movement at a given position so that the diffraction optical element 120 is immobilized in a given rotation state. As described above, when the diffraction optical element 120 is rotated in this manner, an orientation of a diffracted light generated from each position of the diffraction optical element 120 is changed, whereby the orientation of the projection pattern E formed on the surface to be illuminated U can be changed.

Figure 4:
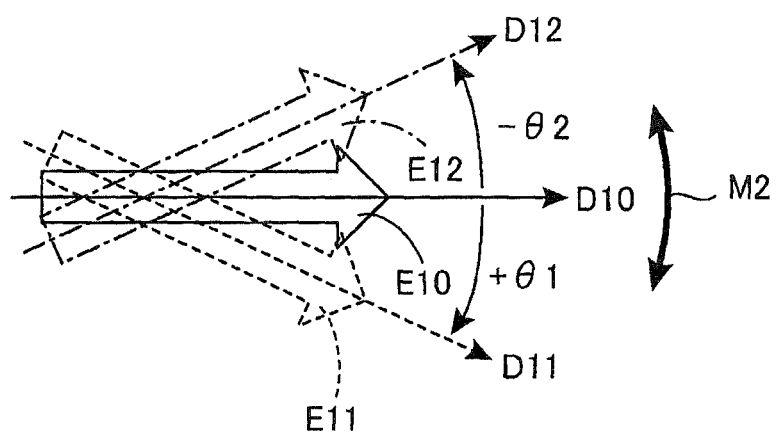
FIG. 4 is a plan view describing a change in orientation of a projection pattern E projected by the illumination device 100 shown in FIG. 1 on a surface to be illuminated U.

FIG. 4 is a plan view describing a change in orientation of the projection pattern E projected by the illumination device 100 shown in FIG. 1 on a surface to be illuminated U. The projection pattern E10 shown by solid lines shows a pattern projected in the standard state, the projection pattern E11 shown by broken lines shows a pattern projected in the first rotation state, and the projection pattern E12 shown by one-dot chain lines shows a pattern projected in the second rotation state. The projection pattern E10 is the arrow graphic pattern oriented in a standard direction D10. The projection pattern D11 is the arrow graphic pattern oriented in a first rotation direction D11. The projection pattern D12 is the arrow graphic pattern oriented in a second rotation direction D12.

At this time, although the diffraction optical element 120 is rotated, a profile, in particular, an outline of a luminous flux diffracted by the diffraction optical element 120 is not substantially changed. Namely, since a luminous flux diffracted by the rotated diffraction optical element 120 corresponds to a luminous flux to be diffracted by the diffraction optical element 120 which has been rotated from the standard state in a rotation direction and by a rotation amount in accordance with the rotation direction and the rotation amount of the diffraction optical element 120, the orientation of the projection pattern E projected on the surface to be illuminated U is changed. However, the shape of the projection pattern E is substantially maintained. Thus, when the arrow graphic projection pattern E is employed as in the illustrated example, the direction of the arrow graphic projected on the surface to be illuminated U is changed by the driving of the optical-element drive unit 130. Thus, in the illustrated example, the orientation of the arrow graphic projection pattern E can be changed by the optical-element drive unit 130 in accordance with a rotation direction and a rotation amount of the diffraction optical element 120.

In the first embodiment, the diffraction optical element 120 is rotated about the rotation axis Rx. Thus, as shown in FIG. 4, even when the diffraction optical element 120 is rotated, the position of the projection pattern E obtained on the surface to be illuminated U is maintained substantially unchanged, while only the orientation is changed.

In the illustrated example, in the standard state, the projection pattern E01 (solid lines), which is oriented in the standard direction D10, is formed. In the first rotation state, the projection pattern E11 (broken lines), which is oriented in the direction D11 rotated by an angle +θ1 (in this patent application, a clockwise direction is defined as a positive angle) with respect to the standard direction D10, is formed. In the second rotation state, the projection pattern E12 (one-dot chain lines), which is oriented in the direction D12 rotated by an angle −θ2 with respect to the standard direction D10, is formed. As a result, the projection pattern E can be rotated in the rotation direction shown by the arrow M2, while the projection position of the projection pattern E projected on the surface to be illuminated U can be maintained substantially unchanged. As shown in FIG. 3, the rotation directions and the rotation angles +θ1 and −θ2 of the projection pattern E can be controlled by the rotation directions and the rotation angles of the diffraction optical element 120.

As described above, when the illumination device 100 is used by installing it on an automobile, the projection patterns E10, E11 and E12 as shown in FIG. 4 can be selectively displayed on a forward road surface in the traveling direction of the automobile. Thus, it is possible to inform a pedestrian of the traveling direction of the automobile. Namely, when the automobile goes straight ahead, the pattern E10 can be displayed on the road surface. When the automobile turns right, the projection pattern E11 can be displayed on the road surface. When the automobile turns left, the projection pattern E12 can be displayed on the road surface.

In particular, in the illumination device 100 according to the example shown in FIG. 1, the diffraction optical element 120 is oriented such that the incident surface P2 and the parallel incident light L are orthogonal to each other, and the optical-element drive unit 130 is configured to rotate the diffraction optical element 120 in the rotation plane P1 including the incident surface P2. To be more specific, this embodiment is described based on the XYZ three-dimensional orthogonal coordinate system having the X axis, the Y axis and the Z axis which are orthogonal to one another. The light source 110 generates the parallel incident light L parallel to the X axis. The parallel incident light L is incident on the incident surface P2 of the diffraction optical element 120. The diffraction optical element 120 is formed of a hologram recording medium which is disposed parallel to the YZ plane. The hologram recording medium records an interference fringe for generating a reconstructed image serving as the projection pattern E on the surface to be illuminated U parallel to the XY plane. Moreover, optical-element drive unit 130 rotates the diffraction optical element 120 in the rotation plane P1 parallel to the YZ plane.

Due to such a structure, a desired projection pattern E can be projected on a surface to be illuminated U such as a road surface, a ground surface, a floor surface, a surface below water, and a wall surface. Moreover, a projection position and a projection orientation of the projection pattern E can be changed, while the shape of the projection pattern E is maintained substantially unchanged. In addition, a clear hologram reconstructed image can be obtained as the projection pattern E, and the diffraction optical element 120 can have a minimum size.

In the example shown in FIG. 1, the diffraction optical element 120 is rotated with respect to the device housing 140 installed on an automobile, while the light source 110 is fixed. However, in accordance with the rotation of the diffraction optical element 120, the light source 110 may be rotated. In this case, during the rotating movement of the diffraction optical element 120, the geometric positional relationship between the light source 110 and the diffraction optical element 120 is kept unchanged, so that the incident area of the light incident on the incident surface P2 is not changed. Thus, even when an element having the incident surface P2 of a given shape is employed as the diffraction optical element 120, there is no possibility that the incident range of an incident light is deviated from the incident surface P2. Thus, a rotation amount of the diffraction optical element 120 can be increased, so that the change in orientation of the projection pattern E can be increased. In addition, since there is no possibility that, because of the rotating movement, the incident range of an incident light is deviated from the incident surface P2, the incident surface P2 can have a minimum area, whereby the diffraction optical element 120 can be reduced in size.

In the aforementioned illumination device 100 according to the example, the light source 110 has the light emission unit 111, the magnifying lens 112a and the collimation lens 112b. The collimation lens 112b is disposed between the light emission unit 111 and the diffraction optical element 120, along an optical path extending from the light emission unit 111 up to the diffraction optical element 120. Thus, a luminous flux having been emitted from the light emission unit 111 and having been broadened by the magnifying lens 112a is made into a parallel luminous flux by the collimation lens 112b. Since the parallel luminous flux is easy to handle, the present invention has a wide field of application. For example, the present invention is suited to be used in an application that finally adjusts an optical path using a hologram. As in the above example, when the diffraction optical element 120 is formed of a hologram recording medium and a parallel luminous flux is used as an incident light, the diffraction optical element 120 can be manufactured easily and economically, as well as a diffraction efficiency can be improved.

§ 2. Second Embodiment

Figure 5:
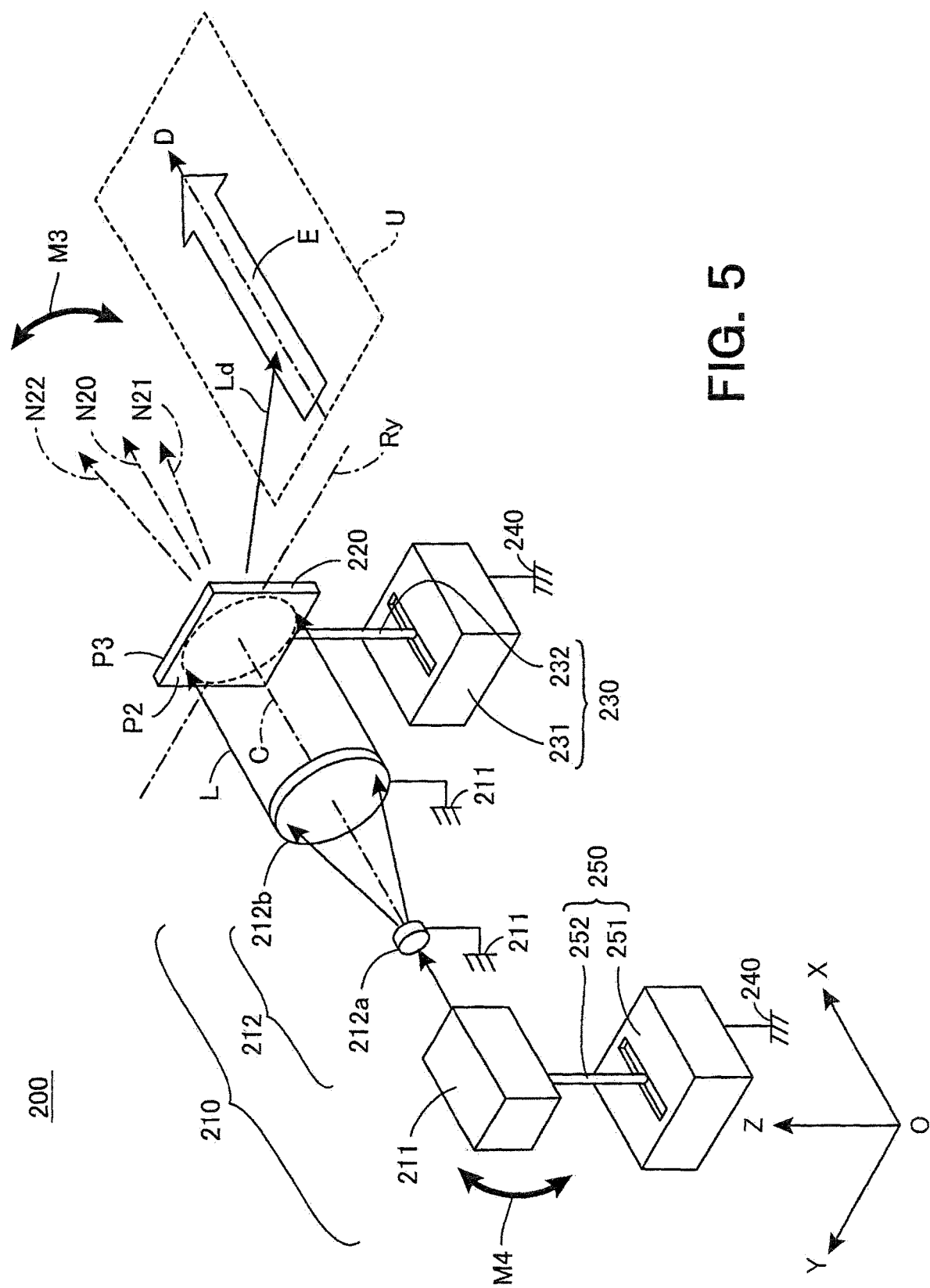
FIG. 5 is a perspective view showing an overall structure of an illumination device 200 according to a second embodiment of the present invention.

Next, a second embodiment of the present invention is described with reference to FIGS. 5 to 7. FIG. 5 is a perspective view showing an overall structure of an illumination device 200 according to the second embodiment of the present invention. Similarly to the aforementioned illumination device 100, the illumination device 200 is an illumination device having a function of projecting a desired projection pattern E on a predetermined surface to be illuminated U, and has a structure similar to that of the illumination device 100. Thus, an example in which the illumination device 200 is installed on an automobile, and a projection pattern E of an arrow graphic showing a traveling direction thereof is projected on a forward road surface is also described. Thus, in FIG. 5, the surface to be illuminated U is set at a position on a road surface in front of the automobile, and the arrow graphic projection pattern E oriented in a direction D is projected on the surface to be illuminated U.

As shown in the figures, similarly to the aforementioned illumination device 100, the illumination device 200 comprises a light source 210, a diffraction optical element 220 that diffracts a light L from the light source 210 and projects a projection pattern E on a surface to be illuminated U (on a forward road surface in this example), an optical-element drive unit 230 that supports the diffraction optical element 220 and drives the same, and a device housing 240 (illustration omitted) that accommodates them. A feature of the illumination device 200 according to the second embodiment is that a light-source drive unit 250 is further added. The light-source drive unit 250 has a function of supporting the light source 210 and driving the same.

Although not shown in the figures, the illumination device 200 comprises the device housing 240. The device housing 240 is a housing that accommodates the light source 210, the diffraction optical element 220, the optical-element drive unit 230 and the light-source drive unit 250. In the example shown, the device housing 240 is installed on a front part of the automobile. The device housing 240 also serves a function of fixedly supporting the optical-element drive unit 230 and the light-source drive unit 250.

Also in FIG. 5, in order to clearly show the fixedly supporting state of the respective constituent elements, the discrete parts of the device housing 240 are shown by using ground symbols of an electric circuit. Specifically, lines extending downward from the optical-element drive unit 230 and the light-source drive unit 250 and ground symbols 240 shown on lower ends of the lines in FIG. 5 show that these respective constituent elements are fixedly supported by the device housing 240. As described below, the diffraction optical element 220 is supported by the optical-element drive unit 230 so as to be movable with respect to the device housing 240.

Similarly, the light source 210 is supported by the light-source drive unit 250 so as to be movable with respect to the device housing 240. A magnifying lens 212a and a collimation lens 212b (optical shaping system 212) as the discrete constituent elements of the light source 210 are fixed on a light emission unit 211, and are configured to move in accordance with the movement of the light emission unit 211. Bent lines extending downward from the magnifying lens 212a and the collimation lens 212b and ground symbols 211 shown on left ends of the lines in FIG. 5 show that these respective constituent elements are fixedly supported by the light emission unit 211. The light-source drive unit 250 has a function of driving the light source 210 as a whole.

Also in FIG. 5, for the convenience of describing a geometric positional relationship among the respective constituent elements that constitute the illumination device 200, an XYZ three-dimensional orthogonal coordinate system is defined. The illumination device 200 is installed on the automobile such that its traveling direction corresponds to an X-axis plus direction, and the surface to be illuminated U (forward road surface) is defined on a plane parallel to an XY plane. In order to illuminate the surface to be illuminated U, in an illustrated standard state, the light source 210 has a function of emitting an illumination light in the X-axis plus direction. As described below, the orientation of the light source 210 can be changed by the light-source drive unit 250.

Functions of the light source 210 and the diffraction optical element 220 in the standard state shown in FIG. 5 are totally the same as the functions of the light source 110 and the diffraction optical element 120 in the illumination device 100 according to the first embodiment shown in FIG. 1. The light source 210 has the light emission unit 211 that generates a laser beam, and the optical shaping system 212 that broadens the laser beam to generate a parallel incident light L. The optical shaping system 212 has the magnifying lens 212a and the collimation lens 212b. The parallel incident light L having been shaped by the optical shaping system 212 is incident on an incident surface P2 of the diffraction optical element 220. In the illustrated example, an incident area in the incident surface P2 on which the parallel incident light L is incident is a circular area shown by broken lines.

The diffraction optical element 220 has a function of diffracting the parallel incident light L from the light source 210, and projecting the desired projection pattern E on the surface to be illuminated U by means of the thus obtained diffracted light Ld. In this example, similarly to the diffraction optical element 120 shown in FIG. 1, the diffraction optical element 220 is formed of a hologram recording medium that records an interference fringe corresponding to a center wavelength of the laser light emitted from the light emission unit 211. The hologram recording medium records an interference fringe for generating a reconstructed image serving as the projection pattern E on the surface to be illuminated U. As described above, the diffraction optical element 220 can be manufactured either by using an object light from an actual scattering plate and a reference light, or by using a computer generated hologram.

Since the structures and the functions of the light source 210 and the diffraction optical element 220 shown in FIG. 5 are totally the same as the functions of the light source 110 and the diffraction optical element 120 shown in FIG. 1, detailed description thereof is omitted here.

On the other hand, the optical-element drive unit 230 and the light-source drive unit 250 used in the illumination device 200 according to the second embodiment perform operations for changing a position of the projection pattern E formed on the surface to be illuminated U. In the illustrated example, the projection pattern E is formed by an arrow graphic oriented in a direction D. By performing a driving operation described below, the projection pattern E can be moved along the X-axis direction.

The optical-element drive unit 130 shown in FIG. 1 has a function of rotating the diffraction optical element 120 about the rotation axis Rx orthogonal to the rotation plane P1. On the other hand, the optical-element drive unit 230 shown in FIG. 5 has a function of rotating the diffraction optical element 220 about a ration axis Ry that passes through a center point in the diffraction optical element 220 and is parallel to the Y axis. In this example, the rotation axis Ry is an axis that passes through the center position of the diffraction optical element 220 in a thickness direction thereof.

FIG. 5 shows that the diffraction optical element 220 is in the standard state. The incident surface P2 and an emergent surface P3 of the diffraction optical element 220 are maintained parallel to the YZ plane. On the other hand, the parallel incident light L is a parallel luminous flux moving in the X-axis plus direction. Thus, in the illustrated standard state, the parallel incident light L is a parallel luminous flux orthogonal to the incident surface P2, and is incident on the incident surface P2 from a direction perpendicular thereto. Thus, the optical-element drive unit 230 rotates the diffraction optical element 220 about the rotation axis Ry orthogonal to the parallel incident light L.

As shown, in the standard state, when a normal line N20 that is normal to the incident surface P2 is defined, an optical axis C of the parallel incident light L is parallel to the normal line N20. On the other hand, an illustrated normal line N21 shows a normal line that is normal to the incident surface P2 when the diffraction optical element 220 is rotated about the rotation axis Ry so as to be in a first rotation state, while an illustrated normal line N22 shows a normal line that is normal to the incident surface P2 when the diffraction optical element 220 is reversely rotated about the rotation axis Ry so as to be in a second rotation state. In the illustrated example, the normal line N21 is a normal line N20 which has been downwardly inclined, and the normal line N22 is a normal line N20 which has been upwardly inclined. Thus, the diffraction optical element 220 is rotated about the rotation axis Ry in a longitudinal direction shown by an arrow M3.

In order to longitudinally change the orientation of the incident surface P2 of the diffraction optical element 220, as shown in the figures, the optical-element drive unit 230 has a drive mechanism 231 and a support arm 232, and has a function of supporting the diffraction optical element 220 and for rotating the diffraction optical element 220 about the rotation axis Ry in the direction shown by the arrow M3. Namely, the drive mechanism 231 has a function of swinging the support arm 232 about the rotation axis Ry. Since such a drive mechanism 231 can be produced by using a known mechanism, detailed description thereof is omitted here.

In the illumination device 200 according to the second embodiment, an operation for driving the diffraction optical element 220 is performed by the optical-element drive unit 230, and an operation for driving the light source 210 is simultaneously performed by the light-source drive unit 250. Namely, in order to change the orientation of the light L from the light source 210 in accordance with the change in direction of the incident surface P2 of the diffraction optical element 220, the light-source drive unit 250 performs a driving operation for longitudinally changing the orientation of the light source 210.

In order to longitudinally change the direction of the light source 210, as shown in the figures, the light-source drive unit 250 has a drive mechanism 251 and a support arm 252, and has a function of supporting the light source 210 and of rotating the light source 210 in a direction shown by an arrow M4. Since such a drive mechanism 251 can also be produced by using a known mechanism, detailed description thereof is omitted here.

Ideally, the driving operation by the light-source drive unit 250 is preferably an operation for rotating the light source 210 about the rotation axis Ry parallel to the Y axis. In this case, the light source 210 and the diffraction optical element 220 are rotated together about the rotation axis Ry. Thus, while the relative positional relationship between the light source 210 and the diffraction optical element 220 is kept unchanged, their relative positions with respect to the device housing 240 can be changed.

In other words, when the aforementioned ideal driving method is employed, the light-source drive unit 250 changes the orientation of the light L from the light source 210, such that the an angle (0° in the illustrated example) between the optical axis C of the incident light that is incident on the diffraction optical element 220 and the normal line N20 that is normal to the incident surface P2 of the diffraction optical element 220 is kept unchanged. Thus, a geometric position of the incident light (parallel incite light L) that is incident on the diffraction optical element 220 is unchanged at all times, and there is no possibility that a part of a cross-section of the parallel incident light L protrudes from the incident surface P2 of the diffraction optical element 220.

Practically, even if the rotation axis of the light source 210 does not completely coincide with the rotation axis Ry of the diffraction optical element 220, no serious trouble occurs. For example, it is possible to set, as the rotation axis of the light source 210, an axis which is disposed nearer to the light source 210 than the rotation axis Ry and is parallel to the Y axis. When the rotation axis of the light source 210 does not coincide with the rotation axis Ry of the diffraction optical element 220, the relative positional relationship between the light source 210 and the diffraction optical element 220 cannot be kept unchanged. Thus, there is a possibility that a part of the cross-section of the parallel incident light L protrudes from the incident surface P2 of the diffraction optical element 220. However, even if such a protrusion occurs, only a quantity of light for illumination slightly decreases, and no serious trouble occurs (a protruding light is preferably cut by an aperture). It goes without saying that the size of the diffraction optical element 220 is designed to be slightly larger, in order to prevent such a protrusion.

Namely, even if the ideal driving method is not employed, no serious problem practically occurs. When the light source 210 is configured to be rotated about a rotation axis disposed nearer thereto than the rotation axis Ry, a displacement range of the light source 210 can be suppressed, whereby the device can be more reduced in size.

When the orientation of the incident surface P2 of the diffraction optical element 220 is changed by the optical-element drive unit 230 and, in accordance with the change in orientation, the orientation of the light L from the light source 210 is changed by the light-source drive unit 250, namely, when a direction orthogonal to the surface to be illuminated U is referred to as a vertical direction, a deflection angle between the normal line N20 and the vertical direction and a deflection angle between the light L and the vertical direction are associated with each other, a traveling direction of the luminous flux of the diffracted light Ld emitted from the emergent surface P3 of the diffraction optical element 220 is changed. As a result, the position of the projection pattern E formed on the surface to be illuminated U is also changed. The drive mechanisms 231 and 251 can rotate the diffraction optical element 220 and the light source 210 in a given direction by a given amount, and can stop the rotating movement at a given position so that the diffraction optical element 220 and the light source 210 are immobilized in a given rotation state. Thus, the projection pattern E can be displayed at a desired position.

Figure 6:
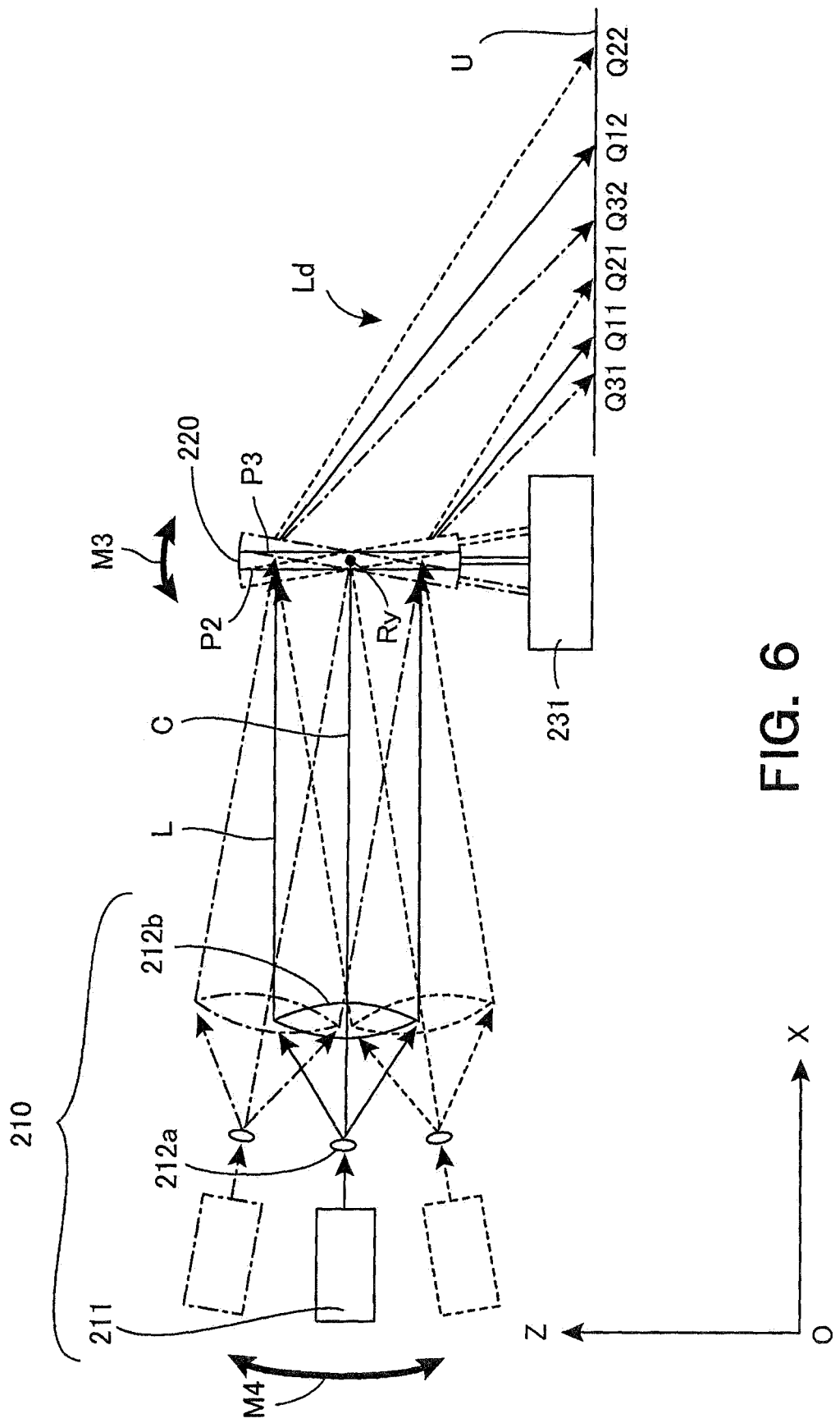
FIG. 6 is a side view of the illumination device 200 shown in FIG. 5 (illustration of some constituent elements is omitted).

FIG. 6 is a side view of the illumination device 200 shown in FIG. 5 (illustration of some constituent elements is omitted). Solid lines in FIG. 6 show the positions of the respective constituent elements in the standard state shown in FIG. 5 (a state in which the incident surface P2 and the emergent surface P3 of the diffraction optical element 220 are maintained parallel to the YZ plane) and the optical path of the laser light. Namely, the light emission unit 211 shown by the solid line emits a laser light in the X-axis plus direction. The laser light passes through the magnifying lens 212a and the collimation lens 212b so as to be shaped into a parallel incident light L parallel to the X axis. The optical axis C shown by the solid line corresponds to a center axis of the luminous flux forming the parallel incident light L. In the illustrated example, the optical axis C is an axis that passes through a center point of the plate-like diffraction optical element 220.

The diffraction optical element 220 shown by the solid lines shows a position of the diffraction optical element 220 in the standard state, which is seen from a lateral side. The parallel incident light L shown by the solid line, which was incident on the incident surface P2 from the left side in FIG. 6, is projected, as the diffracted light Ld shown by the solid line from the emergent surface P3, onto the surface to be illuminated U (a plane parallel to the XY plane). FIG. 6 shows an example in which the diffracted light Ld (solid line) by the parallel incident light L (solid line) incident on the diffraction optical element 220 reaches a range between projection points Q11 and Q12 on the surface to be illuminated U.

Since the diffraction optical element 220 is a hologram recording medium, a diffracted light of a light incident on a given point in the diffraction optical element 220 reaches the range between the projection points Q11 and Q12 and forms the projection pattern E in principle. When the projection pattern E formed on the surface to be illuminated U is the arrow graphic shown in FIG. 5, the projection point Q11 is a root end portion of the arrow graphic (a nearest end seen from the illumination device 200), and the projection point Q12 is a distal end portion of the arrow graphic (a farthest end seen from the illumination device 200).

On the other hand, broken lines in FIG. 6 show the positions of the respective constituent elements in the first rotation state (a state in which the incident surface P2 and the emergent surface P3 of the diffraction optical element 220 are rotated from the standard state counterclockwise in FIG. 6 about the rotation axis Ry) and the optical path of the laser light. Herein, an example in which the aforementioned ideal driving operation is performed so that the light source 210 and the diffraction optical element 220 are both rotated about the rotation axis Ry is shown. Thus, an angle (0° in the illustrated example) between the optical axis C of the incident light and the normal line that is normal to the incident surface P2 of the diffraction optical element 220 is kept unchanged at all times, whereby the diffraction is performed by the diffraction optical element 220 under the best condition.

However, since the relative position of the diffraction optical element 220 with respect to the surface to be illuminated U is changed, the parallel incident light L shown by the broken lines, which was incident on the incident surface P2 from the left side in FIG. 6, is projected, as the diffracted light Ld shown by the broken lines from the emergent surface P3, on the surface to be illuminated U. As a result, the diffracted light Ld (broken lines) by the parallel incident light L (broken lines) incident on the diffraction optical element 220 reaches a range between projection points Q21 and Q22 on the surface to be illuminated U. When the projection pattern E formed in the surface to be illuminated is the arrow graphic shown in FIG. 5, the projection point Q21 is a root end portion of the arrow graphic, and the projection point Q22 is a distal end portion of the arrow graphic.

One-dot chain lines in FIG. 6 show the positions of the respective constituent elements in the second rotation state (a state in which the incident surface P2 and the emergent surface P3 of the diffraction optical element 220 are rotated from the standard state clockwise in FIG. 6 about the rotation axis Ry) and the optical path of the laser light. Herein, an example in which the aforementioned ideal driving operation is also performed so that the light source 210 and the diffraction optical element 220 are both rotated about the rotation axis Ry. Thus, an angle (0° in the illustrated example) between the optical axis C of the incident light and the normal line that is normal to the incident surface P2 of the diffraction optical element 220 is kept unchanged at all times, whereby the diffraction is performed by the diffraction optical element 220 under the best condition.

However, since the relative position of the diffraction optical element 220 with respect to the surface to be illuminated U is changed, the parallel incident light L shown by the one-dot chain lines, which was incident on the incident surface P2 from the left side in FIG. 6, is projected, as the diffracted light Ld shown by the one-dot chain lines from the emergent surface P3, on the surface to be illuminated U. As a result, the diffracted light Ld (one-dot chain lines) incident on the diffraction optical element 220 reaches a range between projection points Q31 and Q32 on the surface to be illuminated U. When the projection pattern E formed on the surface to be illuminated U is the arrow graphic shown in FIG. 5, the projection point Q31 is a root end portion of the arrow graphic, and the projection point Q32 is a distal end portion of the arrow graphic.

Figure 7:
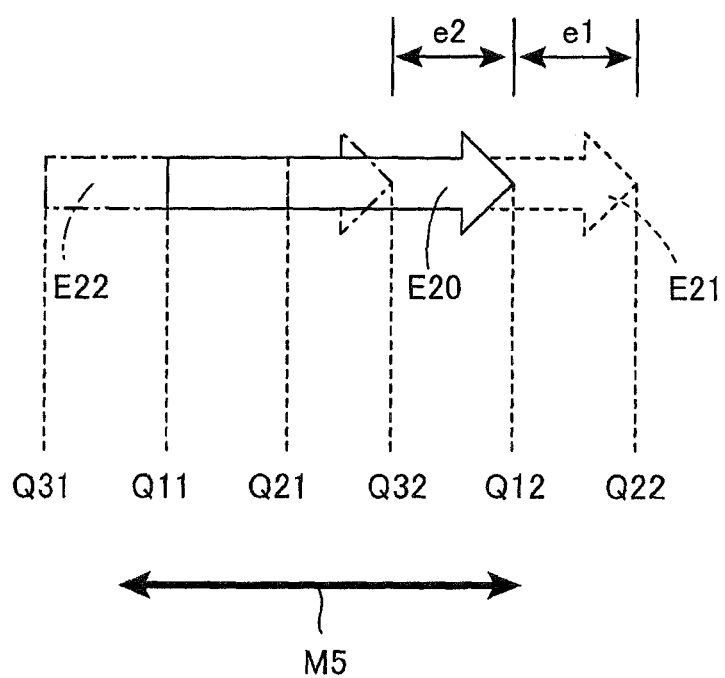
FIG. 7 is a plan view describing a change in position of a projection pattern projected by the illumination device 200 shown in FIG. 5 on a surface to be illuminated U.

FIG. 7 is a plan view describing a change in position of the projection pattern projected by the illumination device 200 shown in FIG. 5 on the surface to be illuminated U. The projection pattern E20 shown by solid lines in FIG. 7 shows a pattern to be projected in the standard state, the projection pattern E21 shown by broken lines shows a pattern to be projected in the first rotation state, and the projection pattern E22 shown by one-dot chain lines shows a pattern to be projected in the second rotation state. All the projection patterns are arrow graphic patterns oriented in the right direction in FIG. 6 (X-axis plus direction). However, as compared with the position of the projection pattern E20, the projection pattern E21 is shifted rightward by a displacement amount e1, and the projection pattern E22 is shifted leftward by a displacement amount e2.

Also in this case, although the diffraction optical element 220 is rotated, the profile, in particular, the outline of the luminous flux diffracted by the diffraction optical element 220 is not substantially changed, and the shape of the projection pattern E is substantially maintained. When the arrow graphic projection pattern E is employed like the illustrated example, the position of the arrow graphic projected on the surface to be illuminated U is changed by the driving operations of the optical-element drive unit 230 and the light-source drive unit 250. In the illustrated example, the position of the arrow graphic projection pattern E with respect to the X-axis direction can be changed by the optical-element drive unit 230 and the light-source drive unit 250, in accordance with rotation directions and rotation amounts of the light source 210 and the diffraction optical element 220, whereby the projection pattern E can be moved along a displacement direction M5 parallel to the X axis. In the example shown in FIG. 5, the orientation of the projection pattern E obtained on the surface to be illuminated U is not changed but is maintained as it is.

In short, in the illumination device 200 according to the second embodiment described herein, when a direction (Z-axis direction in the example of FIG. 5) orthogonal to the surface to be illuminated U is defined as a vertical direction, the optical-element drive unit 230 is configured to rotate the diffraction optical element 220 such that the normal line N20 that is normal to the incident surface P2 is vertically displaced, and, in accordance with the change in orientation of the diffraction optical element 220, the light-source drive unit 250 is configured to change the orientation of the light L from the light source 210.

It is not necessary that the rotation axis is parallel to the Y axis. However, as in the illumination device 200 shown in FIG. 5, it is practically preferable to set the rotation axis Ry parallel to the Y axis. In this case, the diffraction optical element 220 can perform efficient diffraction, and the projection pattern E can be moved along the displacement direction M5 parallel to the X axis, as in the example shown in FIG. 7. In addition, the device design can be facilitated.

In the case of employing the example shown in FIG. 5, when the XYZ three-dimensional orthogonal coordinate system having the X axis, the Y axis and the Z axis orthogonal to one another is defined, and the state in which the incident surface P2 of the diffraction optical element 220 is disposed in the orientation parallel to the YZ plane is defined as the standard state, in this standard state, the light source 210 generates a parallel incident light L parallel to the X axis and causes the parallel incident light L to be incident on the incident surface P2. The diffraction optical element 220 is formed of a hologram recording medium, and the hologram recording medium records an interference fringe for generating a reconstructed image serving as the projection pattern E on the surface to be illuminated U parallel to the XY plane. The optical-element drive unit 230 is configured to rotate the diffraction optical element 220 about the rotation axis Ry parallel to the Y axis, and, in accordance with the change in orientation of the diffraction optical element 220, the light-source drive unit 250 is configured to change the orientation of the light L from the light source 210 along a plane parallel to the XZ plane.

Due to such a structure, a desired projection pattern E can be projected on a surface to be illuminated U such as a road surface, a ground surface, a floor surface, a surface below water, and a wall surface. Moreover, a projection position of the projection pattern E can be changed, while the shape of the projection pattern E is maintained substantially unchanged.

§ 3. Third Embodiment

Figure 8:
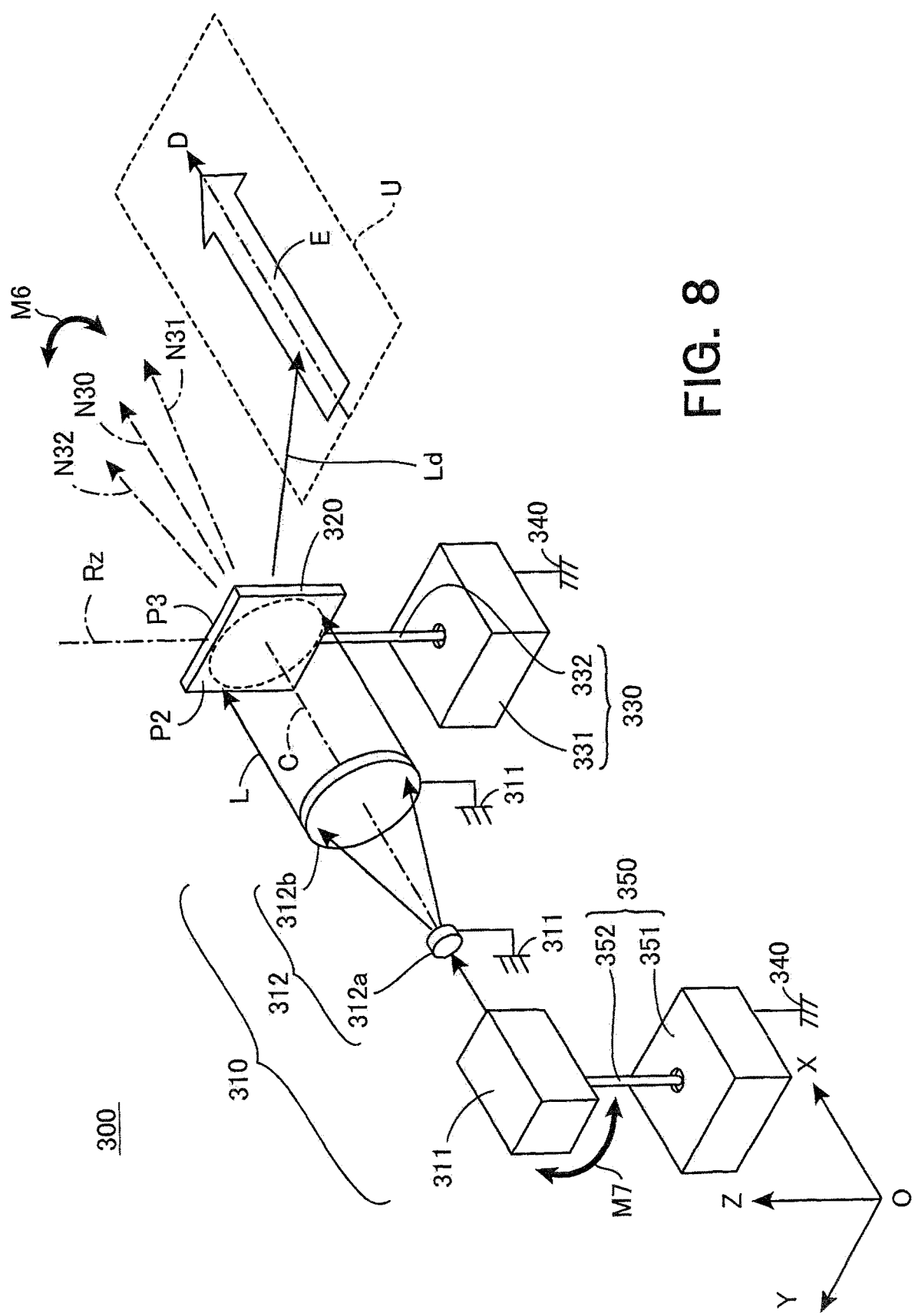
FIG. 8 is a perspective view showing an overall structure of an illumination device 300 according to a third embodiment of the present invention.

Next, a third embodiment of the present invention is described with reference to FIGS. 8 to 10. FIG. 8 is a perspective view showing an overall structure of an illumination device 300 according to a third embodiment of the present invention. Similarly to the aforementioned illumination devices 100 and 200, the illumination device 300 is an illumination device having a function of projecting a desired projection pattern E on a predetermined surface to be illuminated U, and has a structure similar to those of the illumination devices 100 and 200. Thus, an example in which the illumination device 300 is installed on an automobile and a projection pattern E of an arrow graphic showing a traveling direction thereof is projected on a forward road surface is also described. Thus, in FIG. 8, the surface to be illuminated U is set at a position on a road surface in front of the automobile, and the arrow graphic projection pattern E oriented in a direction D is projected on the surface to be illuminated U.

As shown, similarly to the aforementioned illumination device 200, the illumination device 300 comprises a light source 310, a diffraction optical element 320 that diffracts a light L from the light source 310 and projects a projection pattern E on a surface to be illuminated U (on a forward road surface in this example), an optical-element drive unit 330 that supports the diffraction optical element 320 and drives the same, a light-source drive unit 350 that supports the light source 310 and drives the same, and a device housing 340 (illustration omitted) that accommodates them.

The device housing 340 is a housing that accommodates the light source 310, the diffraction optical element 320, the optical-element drive unit 330 and the light-source drive unit 350. In the example shown, the device housing 340 is installed on a front part of the automobile. The device housing 340 also serves a function of fixedly supporting the optical-element drive unit 330 and the light-source drive unit 350.

Also in FIG. 8, in order to clearly show the fixedly supporting state of the respective constituent elements, the discrete parts of the device housing 340 are shown by using ground symbols of an electric circuit. Specifically, lines extending downward from the optical-element drive unit 330 and the light-source drive unit 350 and ground symbols 340 shown on lower ends of the lines in FIG. 8 show that these respective constituent elements are fixedly supported by the device housing 340.

Similarly to the illumination device 200 shown in FIG. 5, the diffraction optical element 320 is supported by the optical-element drive unit 330 so as to be movable with respect to the device housing 340. Similarly, the light source 310 is supported by the light-source drive unit 350 so as to be movable with respect to the device housing 340. A magnifying lens 312a and a collimation lens 312b (optical shaping system 312) as the discrete constituent elements of the light source 310 are fixed on a light emission unit 311, and are configured to move in accordance with the movement of the light emission unit 311. Bent lines extending downward from the magnifying lens 312a and the collimation lens 312b and ground symbols 311 shown on left ends of the lines in FIG. 8 show that these respective constituent elements are fixedly supported by the light emission unit 311. The light-source drive unit 350 has a function of driving the light source 310 as a whole.

Also in FIG. 8, for the convenience of describing a geometric positional relationship among the respective constituent elements that constitute the illumination device 300, an XYZ three-dimensional orthogonal coordinate system is defined. The illumination device 300 is installed on the automobile such that its traveling direction corresponds to an X-axis plus direction, and the surface to be illuminated U (forward road surface) is defined on a plane parallel to an XY plane. In order to illumine the surface to be illuminated U, in an illustrated standard state, the light source 310 has a function of emitting an illumination light in the X-axis plus direction. As described below, the orientation of the light source 310 can be changed by the light-source drive unit 350.

Functions of the light source 310 and the diffraction optical element 320 in the standard state shown in FIG. 8 are totally the same as the functions of the light source 210 and the diffraction optical element 220 of the illumination device 200 according to the second embodiment shown in FIG. 5. The light source 310 has the light emission unit 311 that generates a laser beam, and the optical shaping system 312 that broadens the laser beam to generate a parallel incident light L. The optical shaping system 312 has the magnifying lens 312a and the collimation lens 312b. The parallel incident light L having been shaped by the optical shaping system 312 is incident on an incident surface P2 of the diffraction optical element 320. In the illustrated example, an incident area in the incident surface P2 on which the parallel incident light L is incident is a circular area shown by broken lines.

The diffraction optical element 320 has a function of diffracting the parallel incident light L from the light source 310, and projecting the desired projection pattern E on the surface to be illuminated U by means of the thus obtained diffracted light Ld. Also in this example, similarly to the diffraction optical elements 120 and 220 shown in FIGS. 1 and 5, the diffraction optical element 320 is formed of a hologram recording medium that records an interference fringe corresponding to a center wavelength of the laser light emitted from the light emission unit 311. The hologram recording medium records an interference fringe for generating a reconstructed image serving as the projection pattern E on the surface to be illuminated U. As described above, the diffraction optical element 320 can be manufactured either by using an object light from an actual scattering plate and a reference light, or by using a computer generated hologram.

Since the structures and the functions of the light source unit 310 and the diffraction optical element 320 shown in FIG. 8 are totally the same as the functions of the light sources 110 and 210 and the diffraction optical elements 120 and 220 shown in FIGS. 1 and 5, detailed description thereof is omitted here.

On the other hand, the optical-element drive unit 330 and the light-source drive unit 350 used in the illumination device 300 according to the third embodiment perform operations for changing a position and an orientation of the projection pattern E formed on the surface to be illuminated U. In the illustrated example, the projection pattern E is formed by an arrow graphic oriented in a direction D. By performing a driving operation described below, the position and the orientation of the projection pattern E can be changed.

The optical-element drive unit 230 show in FIG. 5 has a function of rotating the diffraction optical element 220 about the rotation axis Ry that passes through a center point in the diffraction optical element 220 and is parallel to the Y axis. On the other hand, the optical-element drive unit 330 shown in FIG. 8 has a function of rotating the diffraction optical element 320 about a rotation axis Rz that passes through a center point in the diffraction optical element 320 and is parallel to the Z axis. In this example, the rotation axis Rz is an axis that passes through the center position of the diffraction optical element 320 in a thickness direction thereof.

FIG. 8 shows that the diffraction optical element 320 is in the standard state. The incident surface P2 and an emergent surface P3 of the diffraction optical element 320 are maintained parallel to the YZ plane. On the other hand, the parallel incident light L is a parallel luminous flux moving in the X-axis plus direction. Thus, in the illustrated standard state, the parallel incident light L is a parallel luminous flux orthogonal to the incident surface P2, and is incident on the incident surface P2 from a direction perpendicular thereto. Thus, the optical-element drive unit 330 rotates the diffraction optical element 320 about the rotation axis Rz orthogonal to the parallel incident light L.

As shown, in the standard state, when a normal line N30 that is normal to the incident surface P2 is defined, an optical axis C of the parallel incident light L is parallel to the normal line N30. On the other hand, an illustrate normal line N31 shows a normal line that is normal to the incident surface P2 when the diffraction optical element 320 is rotated about the rotation axis Rz so as to be in a first rotation state, while an illustrated normal line N32 shows a normal line that is normal to the incident surface P2 when the diffraction optical element 320 is reversely rotated about the rotation axis Rz so as to be in a second rotation state. In the illustrated example, the normal line N31 is a forwardly inclined (Y-axis minus direction) normal line N30, and the normal line N32 is a rearwardly inclined (Y-axis plus direction) normal line N30. Thus, the diffraction optical element 320 is rotated about the rotation axis Rz in a transverse direction shown by an arrow M6.

In order to transversely change the orientation of the incident surface P2 of the diffraction optical element 320, as shown, the optical-element drive unit 330 has a drive mechanism 331 and a support arm 332, and has a function of supporting the diffraction optical element 320 and of rotating the diffraction optical element 320 about the rotation axis Rz in the direction shown by the arrow M6. Namely, the drive mechanism 331 has a function of rotating the support arm 332 about the rotation axis Rz. Since such a drive mechanism 331 can be produced by using a known mechanism, detailed description thereof is omitted here.

The diffraction optical element 220 shown in FIG. 5 is rotated about the rotation axis Ry parallel to the Y axis. On the other hand, the diffraction optical element 320 shown in FIG. 8 is rotated about the rotation axis Rz parallel to the Z axis. The difference between these rotation axes makes a great difference between the illumination device 200 according to the second embodiment shown in FIG. 5 and the illumination device 300 according to the third embodiment shown in FIG. 8.

Also in the illumination device 300 according to the third embodiment, an operation for driving the diffraction optical element 320 is performed by the optical-element drive unit 330, and an operation for driving the light source 310 is simultaneously performed by the light-source drive unit 350. Namely, in order to change the orientation of the light L from the light source 310 in accordance with the change in orientation of the incident surface P2 of the diffraction optical element 320, the light-source drive unit 350 performs a driving operation for transversely changing the orientation of the light source 310.

In order to transversely change the orientation of the light source 310, as shown, the light-source drive unit 350 has a drive mechanism 351 and a support arm 352, and has a function of supporting the light source 310 and of rotating the light source 310 in a direction shown by an arrow M7. Since such a drive mechanism 351 can also be produced by using a known mechanism, detailed description thereof is omitted here.

Ideally, the driving operation by the light-source drive unit 350 is preferably an operation for rotating the light source 310 about the rotation axis Rz parallel to the Z axis. In this case, the light source 310 and the diffraction optical element 320 are rotated together about the rotation axis Rz. Thus, while the relative positional relationship between the light source 310 and the diffraction optical element 320 is kept unchanged, their relative positions with respect to the device housing 340 can be changed.

In other words, when the aforementioned ideal driving method is employed, the light-source drive unit 350 changes the orientation of the light L from the light source 310, such that an angle (0° in the illustrated example) between the optical axis C of the incident light that is incident on the diffraction optical element 320 and the normal line N30 that is normal to the incident surface P2 of the diffraction optical element 320 is kept unchanged. Thus, a geometric position of the incident light (parallel incident light L) incident on the diffraction optical element 320 is unchanged at all times, and there is no possibility that a part of a cross-section of the parallel incident light L protrudes from the incident surface P2 of the diffraction optical element 320.

Practically, even if the rotation axis of the light source 310 does not completely coincide with the rotation axis Rz of the diffraction optical element 320, no serious trouble occurs. Actually, in the case of the illumination device 300 shown in FIG. 8, the rotation axis Rz of the diffraction optical element 320 is a center axis of the support arm 332, while the rotation axis of the light source 310 is the center axis of the support arm 352. Namely, their rotation axes differ from each other. However, since both rotation axes are set as axes parallel to the Z axis, the orientation of the light L from the light source 310 is changed in accordance with the change in orientation of the incident surface P2 of the diffraction optical element 320 (when a direction parallel to the surface to be illuminated U is referred to as a horizontal direction, a deflection angle between the normal line N30 and the horizontal direction and a deflection angle between the light L and the horizontal direction are associated with each other). Thus, even when the structure of the illumination device 300 shown in FIG. 8 is employed, a trouble-free driving operation is practically possible.

When the rotation axis of the light source 310 does not coincide with the rotation axis Rz of the diffraction optical element 320, the relative positional relationship between the light source 310 and the diffraction optical element 320 cannot be kept unchanged. Thus, there is a possibility that a part of the cross-section of the parallel incident light L protrudes from the incident surface P2 of the diffraction optical element 320. However, even if such a protrusion occurs, only a quantity of light for illumination slightly decreases, and no serious trouble occurs (a protruding light is preferably cut by an aperture). It goes without saying that the size of the diffraction optical element 320 is designed to be slightly larger, in order to prevent such a protrusion.

As in the illustrated example, when the diffraction optical element 320 is rotated by the support arm 332 and the light source 310 is rotated by the support arm 352, the aforementioned ideal driving method cannot be employed, but no serious trouble practically occurs. When the illustrated structure is employed, the device can be more reduced in size and simplified.

Of course, in order to realize the aforementioned ideal driving operation, the light-source drive unit 350 may be composed of, for example, a rail along an arc whose center is the rotation axis Rz, and a drive mechanism that moves the light source 310 along the rail. In this case, the device increases in size and has a complicated structure, there is no possibility that a part of the cross-section of the parallel incident light L protrudes from the incident surface P2 of the diffraction optical element 320.

When the orientation of the incident surface P2 of the diffraction optical element 320 is changed by the optical-element drive unit 330, and, in accordance with the change in orientation, the orientation of the light L from the light source 310 is changed by the light-source drive unit 350, a traveling direction of the luminous flux of the diffracted light Ld emitted from the emergent surface P3 of the diffraction optical element 320 is changed. As a result, the position and the orientation of the projection pattern E formed on the surface to be illuminated U are also changed. The drive mechanism 331 and 351 can rotate the diffraction optical element 320 and the light source 310 in a given direction by a given amount, and can stop the rotating movement at a given position so that the diffraction optical element 320 and the light source 310 are immobilized in a given rotation state. Thus, the projection pattern E can be displayed at a desired position in a desired orientation.

Figure 9:
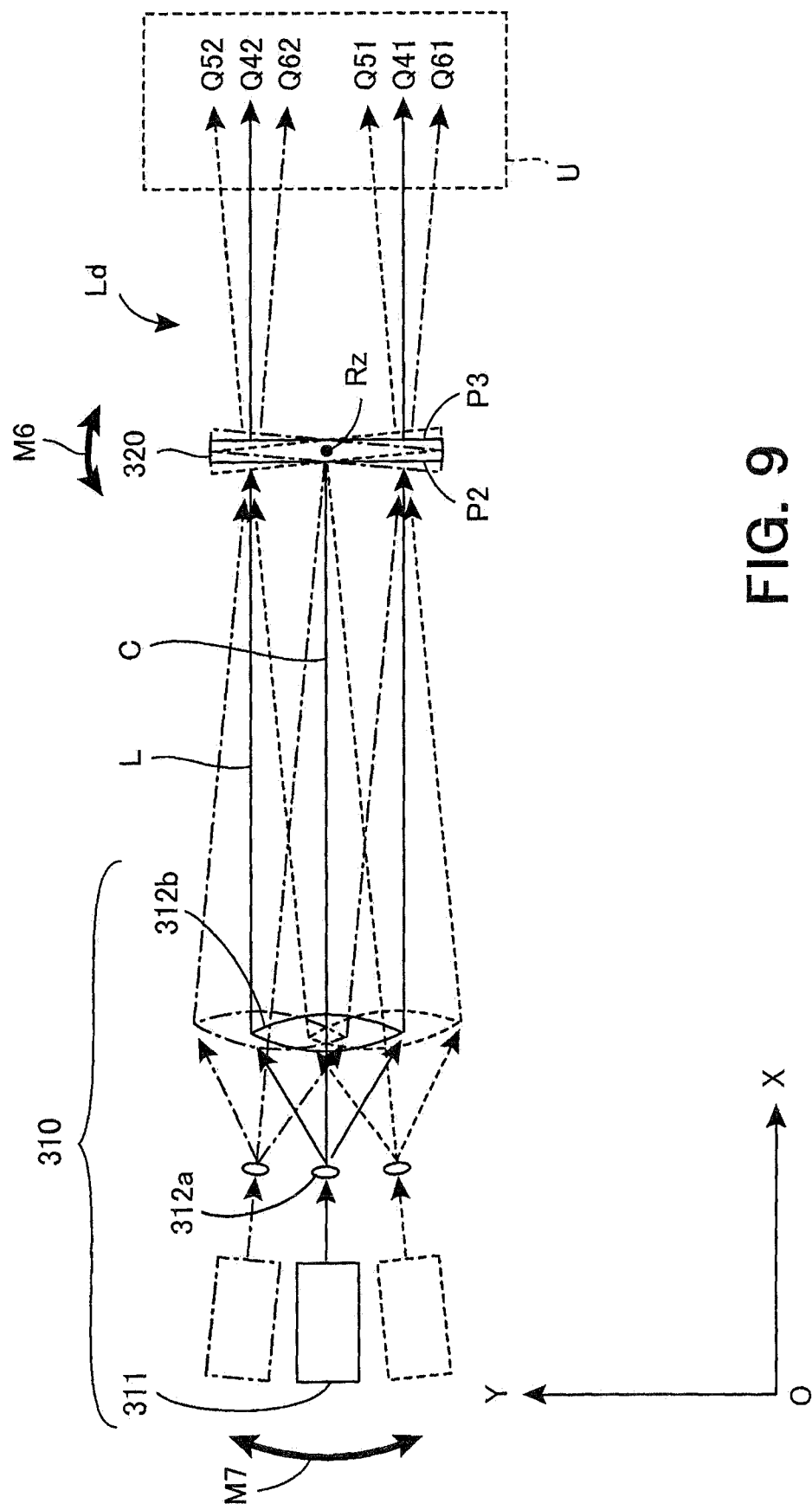
FIG. 9 is a top view of the illumination device 300 shown in FIG. 8 (illustration of some constituent elements is omitted).

FIG. 9 is a top view of the illumination device 300 shown in FIG. 8 (illustration of some constituent elements is omitted). Solid lines in FIG. 9 show the positions of the respective constituent elements in the standard state shown in FIG. 8 (a state in which the incident surface P2 and the emergent surface P3 of the diffraction optical element 320 are maintained parallel to the YZ plane) and the optical path of the laser light. Namely, the light emission unit 311 shown by the solid line emits a laser light in the X-axis plus direction. The laser light passes through the magnifying lens 312a and the collimation lens 312b so as to be shaped into a parallel incident light L parallel to the X axis. The optical axis C shown by the solid line corresponds to a center axis of the luminous flux forming the parallel incident light L. In the illustrated example, the optical axis C is an axis that passes through a center point of the plate-like diffraction optical element 320.

The diffraction optical element 320 shown by the solid lines shows a position of the diffraction optical element 320 in the standard state, which is seen from above. The parallel incident light L shown by the solid line, which is incident on the incident surface P2 from the left side in FIG. 9, is projected, as the diffracted light Ld shown by the solid line from the emergent surface P3, on the surface to be illuminated U (a plane parallel to the XY plane). FIG. 9 shows an example in which the diffracted light Ld (solid line) by the parallel incident light L (solid line) incident on the diffraction optical element 320 reaches a range between projection points Q41 and Q42 on the surface to be illuminated U.

Since the diffraction optical element 320 is a hologram recording medium, a diffracted light of a light incident on a given point in the diffraction optical element 320 reaches the range between the projection points Q41 and Q42 and forms the projection pattern E in principle. When the projection pattern E formed on the surface to be illuminated U is the arrow graphic shown in FIG. 8, when seen from the automobile, the projection point Q41 forms a right side line of the arrow graphic, and the projection point Q42 forms a left side line of the arrow graphic.

On the other hand, broken lines in FIG. 9 show the positions of the respective constituent elements in the first rotation state (a state in which the incident surface P2 and the emergent surface P3 of the diffraction optical element 320 are rotated from the standard state counterclockwise in FIG. 9 about the rotation axis Rz) and the optical path of the laser light. Herein, an example in which the aforementioned ideal driving operation is performed so that the light source 310 and the diffraction optical element 320 are both rotated about the rotation axis Rz is shown. Thus, an angle (0° in the illustrated example) between the optical axis C of the incident light and the normal line that is normal to the incident surface P2 of the diffraction optical element 320 is kept unchanged at all times, whereby the diffraction is performed by the diffraction optical element 320 under the best condition.

However, since the relative position of the diffraction optical element 320 with respect to the surface to be illuminated U is changed, the parallel incident light L shown by the broken lines, which was incident on the incident surface P2 from the left side in FIG. 9, is projected, as the diffracted light Ld shown by the broken lines from the emergent surface P3, on the surface to be illuminated U. As a result, the diffracted light Ld (broken lines) by the parallel incident light L (broken lines), which was incident on the diffraction optical element 320, reaches a range between projection points Q51 and Q52 on the surface to be illuminated U. When the projection pattern E formed on the surface to be illuminated U is the arrow graphic shown in FIG. 8, the projection point Q51 composes a right side line of the arrow graphic and the projection point Q52 composes a left side line of the arrow graphic, seen from the automobile.

One-dot chain lines in FIG. 9 show the positions of the respective constituent elements in the second rotation state (a state in which the incident surface P2 and the emergent surface P3 of the diffraction optical element 320 are rotated from the standard state clockwise in FIG. 9 about the rotation axis Rz) and the optical path of the laser light. Also herein, an example in which the aforementioned ideal driving operation is performed so that the light source 310 and the diffraction optical element 320 are both rotated about the rotation axis Rz is shown. Thus, an angle (0° in the illustrated example) between the optical axis C of the incident light and the normal line that is normal to the incident surface P2 of the diffraction optical element 320 is kept unchanged at all times, whereby the diffraction is performed by the diffraction optical element 320 under the best condition.

However, since the relative position of the diffraction optical element 320 with respect to the surface to be illuminated U is changed, the parallel incident light L shown by the one-dot chain lines, which was incident on the incident surface P2 from the left side in FIG. 9, is projected, as the diffracted light Ld shown by the one-dot chain lines from the emergent surface P3, on the surface to be illuminated U. As a result, the diffracted light Ld (one-dot chain lines) by the parallel incident light L (one-dot chain lines), which was incident on the diffraction optical element 320, reaches a range between projection points Q61 and Q62 on the surface to be illuminated U. When the projection pattern E formed on the surface to be illuminated U is the arrow graphic shown in FIG. 8, the projection point Q61 composes a right side line of the arrow graphic and the projection point Q62 composes a left side line of the arrow graphic, seen from the automobile.

Figure 10:
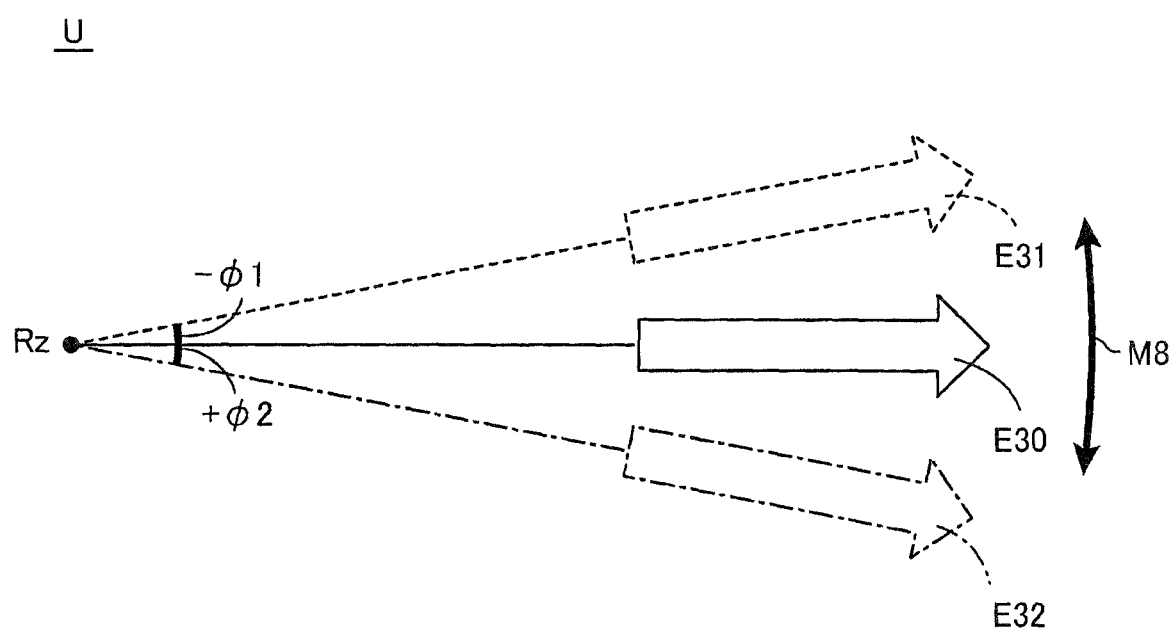
FIG. 10 is a plan view describing a change in position and orientation of a projection pattern projected by the illumination device 300 shown in FIG. 8 on a surface to be illuminated U.

FIG. 10 is a plan view describing a change in poison and direction of the projection pattern projected by the illumination device 300 shown in FIG. 8 on the surface to be illuminated U. The projection pattern E30 shown by solid lines in FIG. 10 shows a pattern to be projected in the standard state, the projection pattern E31 shown by broken lines shows a pattern to be projected in the first rotation state, and the projection pattern E32 shown by one-dot chain lines shows a pattern to be projected in the second rotation state. All the projection patterns are arrow graphic patterns of substantially the same shape. However, as compared with the projection pattern E30, the projection pattern E31 is rotated by an angle φ1, and the projection pattern E32 is rotated by an angle +φ1 (as described above, the clockwise direction corresponds to the plus angle).

Also in this case, although the diffraction optical element 320 is rotated, the profile, in particular, the outline of the luminous flux diffracted by the diffraction optical element 320 is not substantially changed, and the shape of the projection pattern E is substantially maintained. When the arrow graphic pattern E is employed like the illustrated example, the position and the orientation of the arrow graphic projected on the surface to be illuminated U are changed by the driving operations of the optical-element drive unit 330 and the light-source drive unit 350. In the illustrated example, the position and the orientation of the arrow graphic projection pattern E can be changed by the optical-element drive unit 330 and the light-source drive unit 350, in accordance with a rotation direction and a rotation amount of the light source 310 and the diffraction optical element 320, whereby the projection pattern E can be moved along the rotation direction M8 forming an arc whose center is the rotation axis Rz.

In short, in the illumination device 300 according to the third embodiment described herein, when a direction (the X-axis direction and the Y-axis direction in the example of FIG. 8) parallel to the surface to be illuminated U is defined as a horizontal direction, the optical-element drive unit 330 is configured to rotate the diffraction optical element 320 such that the normal line N30 that is normal to the incident surface P2 is horizontally displaced, and, in accordance with the change in orientation of the diffraction optical element 320, the light-source drive unit 350 is configured to change the orientation of the light L from the light source 310.

It is not necessary that the rotation axis is parallel to the Z axis. However, as in the illumination device 300 shown in FIG. 8, it is practically preferable to set the rotation axis Rz parallel to the Z axis. In this case, the diffraction optical element 320 can perform efficient diffraction, and the projection pattern E can be moved along the rotation direction M8 as in the example shown in FIG. 10. In addition, the device design can be facilitated.

In the case of employing the example shown in FIG. 8, when the XYZ three-dimensional orthogonal coordinate system having the X axis, the Y axis and the Z axis orthogonal to one another is defined, and the state in which the incident surface P2 of the diffraction optical element 320 is disposed in the orientation parallel to the YZ plane is defined as the standard state, in this standard state, the light source 310 generates a parallel incident light L parallel to the X axis and causes the parallel incident light L to be incident on the incident surface P2. The diffraction optical element 320 is formed of a hologram recording medium, and the hologram recording medium records an interference fringe for generating a reconstructed image serving as the projection pattern E on the surface to be illuminated U parallel to the XY plane. The optical-element drive unit 330 is configured to rotate the diffraction optical element 320 about the rotation axis Rz parallel to the Z axis, and, in accordance with the change in orientation of the diffraction optical element 320, the light-source drive unit 350 is configured to change the orientation of the light L from the light source 310 along a plane parallel to the XY plane.

Due to such a structure, a desired projection pattern E can be projected on a surface to be illuminated U such as a road surface, a ground surface, a floor surface, a surface below water, and a wall surface. Moreover, a projection position and a projection direction of the projection pattern E can be changed, while the shape of the projection pattern E is maintained substantially unchanged.

§ 4. Fourth Embodiment

Figure 11:
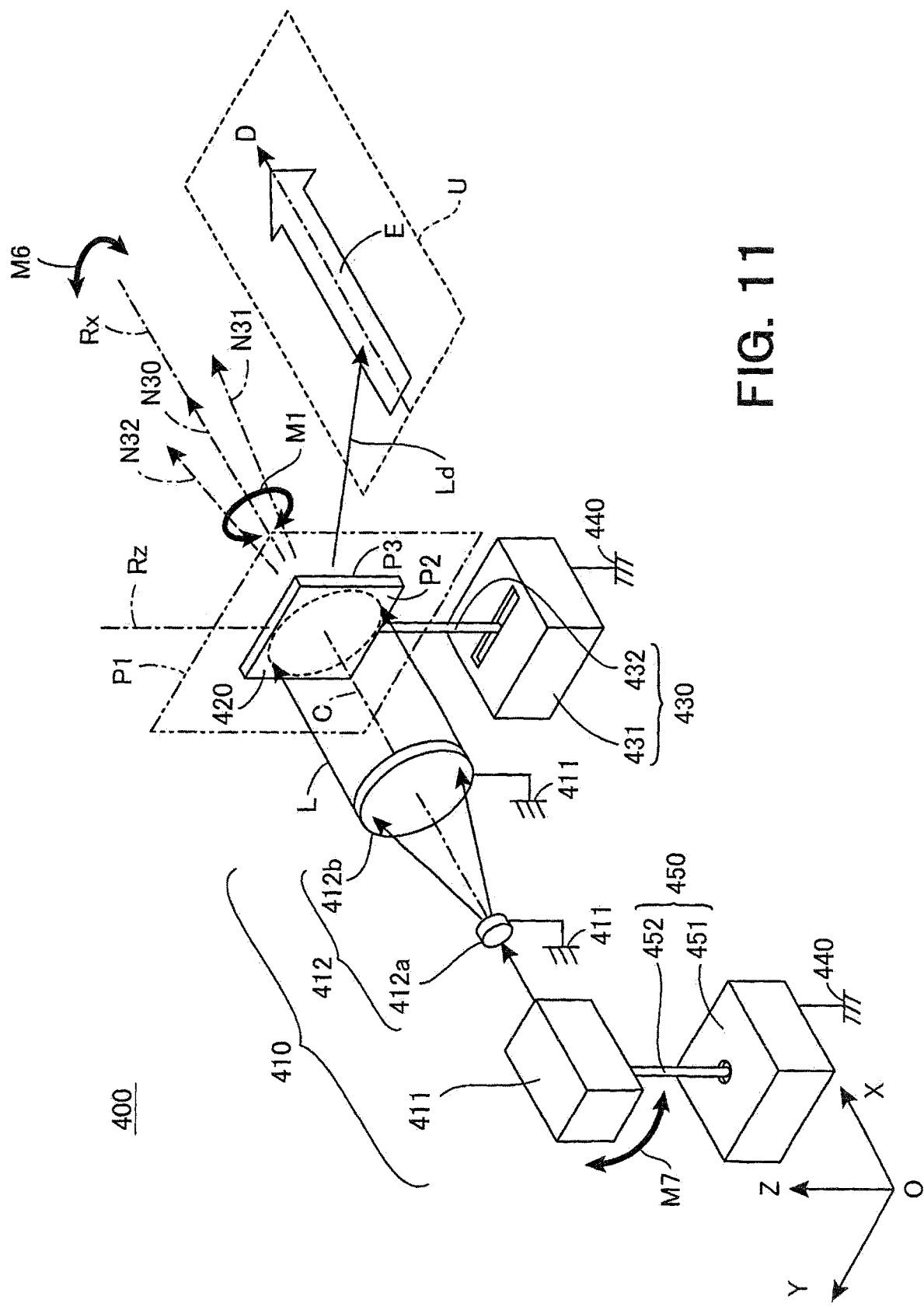
FIG. 11 is a perspective view showing an overall structure of an illumination device 400 according to a fourth embodiment of the present invention.

Next, a fourth embodiment of the present invention is described with reference to FIGS. 11 and 12. FIG. 11 is a perspective view showing an overall structure of an illumination device 400 according to the fourth embodiment of the present invention. The illumination device 400 is a modification example of the illumination device 300 according to the third embodiment which is described in § 3, and its basic structure is substantially the same as the basic structure of the illumination device 300 shown in FIG. 8.

As shown, similarly to the aforementioned illumination device 300, the illumination device 400 comprises a light source 410, a diffraction optical element 420 that diffracts a light L from the light source 410 and projects a projection pattern E on a surface to be illuminated U, an optical-element drive unit 430 that supports the diffraction optical element 420 and drives the same, a light-source drive unit 450 that supports the light source 410 and drives the same, and a device housing 440 (illustration omitted) that accommodates them.

The device housing 440 is a housing that accommodates the light source 410, the diffraction optical element 420, the optical-element drive unit 430 and the light-source drive unit 450. In the example shown, the device housing 440 is installed on a front part of an automobile. The device housing 440 also serves a function of fixedly supporting the optical-element drive unit 430 and the light-source drive unit 450.

Also in FIG. 11, in order to clearly show the fixedly supporting state of the respective constituent elements, the discrete parts of the device housing 440 are shown by using ground symbols of an electric circuit. Specifically, lines extending from the optical-element drive unit 430 and the light-source drive unit 450 and ground symbols 440 shown on lower ends of the lines in FIG. 11 show that these respective constituent elements are fixedly supported by the device housing 440.

The diffraction optical element 420 is supported by optical-element drive unit 430 so as to be movable with respect to the device housing 440. The light source 410 is supported by the light-source drive unit 450 so as to be movable with respect to the device housing 440. A magnifying lens 412a and a collimation lens 412b (optical shaping system 412) as the discrete constituent elements of the light source 410 are fixed on a light emission unit 411, and are configured to move in accordance with the movement of the light emission unit 411. Bent lines extending downward from the magnifying lens 412a and the collimation lens 412b and ground symbols 411 shown on left end of the lines in FIG. 11 show that these respective constituent elements are fixedly supported by the light emission unit 411. The light-source drive unit 450 has a function of driving the light source 410 as a whole.

Also in FIG. 11, for the convenience of describing a geometric positional relationship among the respective constituent elements that constitute the illumination device 400, an XYZ three-dimensional orthogonal coordinate system is defined. The illumination device 400 is installed on an automobile such that its traveling direction corresponds to an X-axis plus direction, and the surface to be illuminated U (forward road surface) is defined on a plane parallel to an XY plane. In order to illumine the surface to be illuminated U, in the illustrated standard state, the light source 410 has a function of emitting a light beam in the X-axis plus direction. As described below, the orientation of the light source 410 can be changed by the light-source drive unit 450.

In FIG. 11, the light source 410, the diffraction optical element 420 and the light-source drive unit 450 of these respective constituent elements have totally the same structures and functions of the light source 310, the diffraction optical element 320 and the light-source drive unit 350 shown in FIG. 8, respectively. Thus, detailed description thereof is omitted here. On the other hand, the optical-element drive unit 430 shown in FIG. 11 has a structure and a function slightly different from those of the optical-element drive unit 330 shown in FIG. 8. This point is described below.

The optical-element drive unit 430 shown in FIG. 11 has the function of the optical-element drive unit 130 shown in FIG. 1, in addition to the function of the optical-element drive unit 330 shown in FIG. 8. Namely, the optical-element drive unit 330 has a function of rotating the diffraction optical element 320 about the rotation axis Rz that passes through a center point in the diffraction optical element 320 and is parallel to the Z axis. The optical-element drive unit 130 has a function of rotating the diffraction optical element 120 about the rotation axis Rx that passes through a center point in the diffraction optical element 120 and is parallel to the axis X. The optical-element drive unit 430 shown in FIG. 11 has both these functions, i.e., a function of rotating the diffraction optical element 420 about the rotation axis Rz that passes through a center point in the diffraction optical element 420 and is parallel to the axis Z, and a function of rotating the diffraction optical element 420 about the rotation axis Rx that passes through a center point in the diffraction optical element 420 and is parallel to the axis X.

In other words, the optical-element drive unit 430 has a function of changing the direction of an incident surface P2 of the diffraction optical element 420, and of rotating the diffraction optical element 420 about the rotation axis Rx orthogonal to a rotation plane P1 including the incident surface P2. Thus, the diffraction optical element 420 is rotated along a rotation direction M6, and is rotated in the rotation plane P1 along a rotation direction M1. In order to realize these rotating movements, the drive mechanism 431 is provided with a function of rotating a support arm 432 about its center axis (rotation axis Rz) and with a function of swinging the support arm 432 about the rotation axis Rx. Since such a drive mechanism 431 can also be produced by using a known mechanism, detailed description thereof is omitted here.

The illumination device 400 according to the fourth embodiment shown in FIG. 11 can perform, in addition to the rotating movement of the projection pattern E performed by the illumination device 300 according to the third embodiment shown in FIG. 8 (the rotating movement along the rotation direction M8 shown in FIG. 10), the rotating movement of the projection pattern E performed by the illumination device 100 according to the first embodiment shown in FIG. 1 (the rotating movement along the rotation direction M2 shown in FIG. 4). By combining these two rotating movements and adjusting a rotation direction and a rotation amount of each rotating movement, a projection pattern E can be translated (moved parallel) on the surface to be illuminated U.

Figure 12:
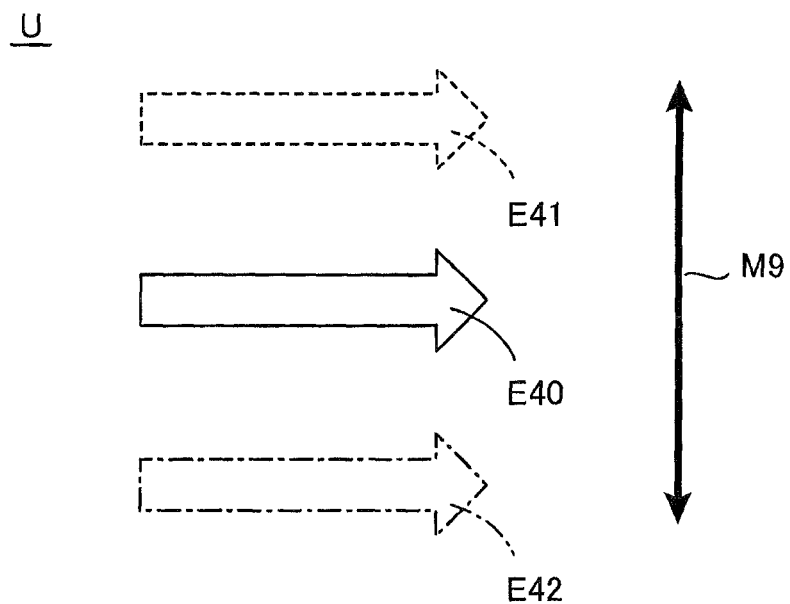
FIG. 12 is a plan view describing a change in position of a projection pattern E projected by the illumination device 400 shown in FIG. 11 on a surface to be illuminated U.

FIG. 12 is a plan view describing a change in position of the projection pattern E projected by the illumination device 400 shown in FIG. 11 on the surface to be illuminated U. In this example, with respect to a projection pattern E40 (a pattern obtained in the standard state) shown by solid lines, a projection pattern 41 shown by broken lines is translated upward in FIG. 12, and a projection pattern 42 shown by one-dot chain lines is translated downward in FIG. 12. By adjusting a rotation direction and a rotation amount of each of the rotating movement about the rotation axis Rx and the rotation movement about the rotation axis Rz performed by the optical-element drive unit 430, the projection pattern E can be translated along a direction shown by a movement direction M9, as shown in FIG. 12. It goes without saying that this embodiment enables a movement with various degrees of freedom in position and orientation, in addition to a parallel movement.

5. Fifth Embodiment

Figure 13:
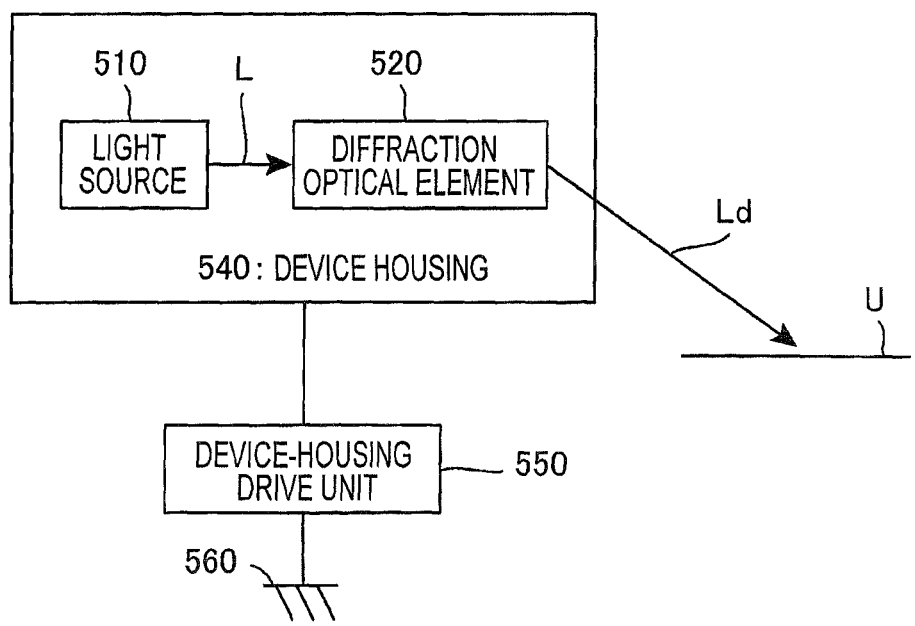
FIG. 13 is a block diagram showing a structure of an illumination device 500 according to a fifth embodiment of the present invention.

Next, a fifth embodiment of the present invention is described with reference to FIG. 13. FIG. 13 is a block diagram showing a structure of an illumination device 500 according to the fifth embodiment of the present invention. The illumination device 500 is also a device for projecting a desired projection pattern E on a surface to be illuminated U. As shown, the illumination device 500 comprises a light source 510, a diffraction optical element 520 that diffracts a light L from the light source 510 and projects a projection pattern E on a surface to be illuminated U, a device housing 540 that accommodates the light source 510 and the diffraction optical element 520, and a device-housing drive unit 550 that drives the device housing 540.

Although FIG. 13 illustrates the above constituent elements in a block diagram, refer to the structures of the aforementioned respective embodiments about specific structures of the respective constituent elements. Specifically, the light source 510 may have a structure similar to that of the light source 110 shown in FIG. 1. The diffraction optical element 520 may have a structure similar to that of the diffraction optical element 120 shown in FIG. 1. The device housing 540 may have any structure as long as it has a function of fixedly supporting the light source 510 and the diffraction optical element 520 and of accommodating them therein.

The illumination device 500 is equipped neither with a light-source drive unit for driving the light source 510 or with an optical-element drive unit for driving the diffraction optical element 520. Instead thereof, the illumination device 500 is equipped with the device-housing drive unit 550 that drives the device housing 540. The device-housing drive unit 550 has a function of installing the device body 540 at an installation position 560, and of driving the device body 540 such that a position or an orientation, or both of the device body 540 with respect to the installation position 560 is/are changed. When the illumination device 500 is used in an automobile, a front grill of the automobile serves as the installation position 560, and the device housing 540 is installed on the front grill through the device-housing drive unit 550.

The device-housing drive unit 550 has a drive mechanism that changes a relative positional relationship between the device housing 540 and the installation position 560. A mechanism that rotates the device housing 540 about a predetermined rotation axis can be used as the drive mechanism, similarly to the drive mechanism employed in the light-source drive unit or the optical-element drive unit in the aforementioned embodiments. Of course, a mechanism that translates the device housing 540 with respect to the installation position 560 may also be used.

By changing a relative positional relationship of the device housing 540 with respect to the installation position 560, a relative positional relationship of a diffracted light Ld with respect to the installation position 560 is changed, whereby a position and an orientation of the projection pattern E formed on the surface to be illuminated U can be changed.

In the illumination device 500 according to the fifth embodiment, the device housing 540 and the respective constituent elements accommodated therein are driven as a whole. Thus, a power load of the device-housing drive unit 550 is larger than power loads of the light-source drive unit and the optical-element drive unit in the aforementioned embodiments, and a sufficient movement space for the device housing 540 has to be ensured. However, since only the light source 510 and the diffraction optical element 520 are accommodated in the device housing 540, an advantage in which, as the device housing 540 and the elements accommodated therein, a conventionally proposed general illumination device can be used as it is can be obtained.

§ 6. Modification Examples

In the above § 1 to § 5, the first to fifth embodiments have been described. Herebelow, various modification examples of the respective embodiments are described.

(1) Modification Example of Rotation Axis

In the first embodiment shown in FIG. 1, the diffraction optical element 120 is rotated about the rotation axis Rx parallel to the X axis. In the second embodiment shown in FIG. 5, the diffraction optical element 220 is rotated about the rotation axis Ry parallel to the Y axis. In the third embodiment shown in FIG. 8, the diffraction optical element 320 is rotated about the rotation axis Rz parallel to the Z axis. In these embodiments, the surface to be illuminated U is defined as a plane parallel to the XY plane, and the parallel incident light L is defined as a light parallel to the X axis in the standard state. Thus, when a rotation axis parallel to a predetermined coordinate axis, such as the above rotation axes Rx, Ry and Rz, is set, efficient diffraction and reduction in size of the device can be advantageously achieved.

However, in the present invention, it is not necessary that a rotation axis about which the diffraction optical element is rotated is set as an axis parallel to the above respective coordinate axes. Such an axis can be set in a given direction. Thus, in a modification example based on the second embodiment shown in FIG. 5, when a direction orthogonal to the surface to be illuminated U is defined as a vertical direction Z, the optical-element drive unit 230 rotates the diffraction optical element 220 about a rotation axis not parallel to the vertical direction (an embodiment in which the rotation axis Rz parallel to the vertical direction is set corresponds to the third embodiment). Similarly, in a modification example based on the third embodiment shown in FIG. 8, when a direction parallel to the surface to be illuminated U is defined as a horizontal direction, the optical-element drive unit 330 rotates the diffraction optical element 320 about a rotation axis not parallel to the horizontal direction (an embodiment in which the rotation axis Rx or Ry parallel to the horizontal direction is set corresponds to the first or second embodiment).

Thus, when the present invention is carried out, it is not necessary that a rotation axis of the diffraction optical element is set as an axis parallel to a predetermined coordinate axis. However, when a rotation plane (a plane orthogonal to the rotation axis) is a plane parallel to an optical axis of the incident light L, an angle between a traveling direction of the parallel incident light L and the incident surface of the diffraction optical element is 0°, whereby substantially no parallel incident light L is incident on the incident surface. Thus, it is necessary to set a rotation axis such that the diffraction optical element is rotated in a plane that is not parallel to the optical axis of the incident light L that is incident on the diffraction optical element, in other words, such that the incident surface of the diffraction optical element and the optical axis of the incident light L are not parallel to each other.

For example, in a modification example based on the illumination device 100 shown in FIG. 1, when the incident surface P2 (and the rotation plane P1 including the incident surface P2) of the diffraction optical element 120 is set as a plane parallel to the XY plane, and the rotation axis is set as an axis parallel to the Z axis, the incident surface P2 is not irradiated with the parallel incident light L traveling in the X-axis plus direction. Namely, such an illumination device 100 does not practically function. Thus, in the case of the illumination device 100 shown in FIG. 1, it is necessary that the rotation plane P1 of the diffraction optical element 120 is set as a plane that is not parallel to an optical axis (X axis) of the parallel incident light L.

In the modification example based on the illumination device 100 shown in FIG. 1, in order to obtain excellent diffraction efficiency, it is preferable that a diffraction condition by the diffraction optical element 120 continues to satisfy the Bragg condition as much as possible, during the rotating movement of the diffraction optical element 120. Thus, an orientation of the rotation plane P1 is preferably set such that an incident angle of the parallel incident light L with respect to the incident surface P2 continues to satisfy the above Bragg condition as much as possible.

In addition, in the case of the illumination device 100 shown in FIG. 1, the rotation axis Rx is an axis that passes through the center of the diffraction optical element 120. However, the rotation axis Rx may not necessarily pass through the center, but may pass through a position deviated from the center of the diffraction optical element 120, or may pass outside the diffraction optical element 120. However, in order to reduce the device in size, the rotation axis Rx preferably passes inside the diffraction optical element 120.

Similarly, in the cases of the illumination device 200 shown in FIG. 5 and the illumination device 300 shown in FIG. 8, the rotation axis Ry, Rz passes through the center position of the diffraction optical element 220, 320 in a thickness direction thereof. However, it is not necessary that the rotation axis Ry, Rz passes through the center position in the thickness direction, but may pass a position deviated from the center position of the diffraction optical element 220, 320 in the thickness direction, may pass through a surface (the incident surface P2 and the emergent surface P3) of the diffraction optical element 220, 320, or may pass outside the diffraction optical element 220, 320. However, in order to reduce the device in size, the rotation axis Ry, Rz preferably passes inside or passes through the surface of the diffraction optical element 220, 320.

(2) Modification Example of Incident Light on Diffraction Optical Element

In the aforementioned respective embodiments, a laser beam generated by the laser light emission unit is broadened by the magnifying lens and then is shaped into a parallel light by the collimation lens, so that the light L incident on the diffraction optical element is a parallel luminous flux. However, in the present invention, it is not necessary that a light incident on the diffraction optical element is made into a parallel luminous flux. For example, the collimation lens may be omitted, and a light that has passed through the magnifying lens to conically diffuse may be incident as it is on the diffraction optical element. In this case, the diffraction optical element records an interference fringe that allows, when the diffraction optical element is irradiated with such a conically diffused light, the desired projection pattern E to be formed by the diffracted light Ld on the surface to be illuminated U as a reconstructed image.

In addition, in the aforementioned respective embodiments, in the standard state, the parallel incident light L is incident perpendicularly on the diffraction optical element. However, an incident light that is incident on the diffraction optical element may not necessarily be incident perpendicularly to the incident surface, and may be incident thereon at a given angle. However, in order to efficiently generate the projection pattern E by means of the diffracted light Ld, it is preferable that the light is perpendicularly incident on the incident surface in the standard state, as in the aforementioned embodiments.

(3) Modification Example of Optical-Element Drive Unit and Light-Source Drive Unit In the second embodiment shown in FIG. 5, the third embodiment shown in FIG. 8 and the fourth embodiment shown in FIG. 11, the optical-element drive unit 230, 330, 430 for driving the diffraction optical element 220, 320, 420, and the light-source drive unit 250, 350, 450 for driving the light source 210, 310, 410 are separately provided. However, an integrated drive unit integrating them may be provided, and the integrated drive unit may support both the diffraction optical element and the light source, and may simultaneously drive both of them.

When the integrated drive unit has both the functions of the optical-light drive unit and the light-source drive unit, the diffraction optical element and the light source are integrally driven. Thus, a relative position of them can be prevented from being changed. In addition, the device can be reduced in size.

In addition, in the second embodiment shown in FIG. 5, the third embodiment shown in FIG. 8 and the fourth embodiment shown in FIG. 11, the light-source drive unit 250, 350, 450 drives the light source 210, 310, 410 as a whole. However, the light-source drive unit may not necessarily drive all the constituent elements of the light source collectively, but may drive only some of the constituent elements of the light source.

For example, in the second embodiment shown in FIG. 5, only the light emission unit 211 may be driven by the light-source drive unit 250, and the magnifying lens 212a and collimation lens 212b, which are the constituent elements of the optical shaping system 212, may be fixed on the device housing 240. In this case, since an incident position of a laser beam emitted from the light emission unit 211 to be incident on the magnifying lens 212a is changed, a position and an orientation of the light L emitted from the collimation lens 212b are changed so that the light L is not a perfect parallel luminous flux. Thus, there is a possibility that the projection pattern E formed on the surface to be illuminated U has a slightly distorted shape or is unclear. However, no serious trouble occurs as long as the distorted shape and the unclearness of the projection pattern E are within a practically allowable range.

Namely, when the structure in which only the light emission unit 211 is driven by the light-source drive unit 250 is employed, the structure of the drive system can be simplified, and the device can be reduced in size.

(4) Modification Example of Multiplying Light Source and Diffraction Optical Element In the aforementioned respective embodiments, the light source has the only one laser light emission unit, but a plurality of the laser light emission units can be provided according to need. In this case, a plurality of the laser light emission units may either be independently provided, or a light emission unit module in which the laser light emission units are arranged on a common substrate may be used.

In addition, a plurality of the laser light emission units may be composed of a laser light emission unit which oscillates a light of a red emission wavelength range, a laser light emission unit which oscillates a light of a green emission wavelength range, and a laser light emission unit which oscillates a light of a blue emission wavelength range. In this case, by superimposing three laser lights emitted by the laser light emission units, the surface to be illuminated U can be illuminated with an illumination light of a desired color. By adjusting radiant fluxes [unit: W] of these laser light emission units, an illumination light color can be adjusted.

As described above, the light source may have a plurality of laser light emission units having radiant fluxes different from one another. Not limited to the example in which the laser light emission units of three colors, i.e., red, green and blue, it goes without saying that the light source may have two laser light emission units or not less than four laser light emission units having emission wavelength ranges different from one another. In addition, in order to increase a light intensity, a plurality of the laser light emission units may be provided for each of the emission wavelength ranges.

When the light source has a plurality of the laser light emission units, a plurality of the optical shaping system may be provided correspondingly to these laser light emission units.

On the other hand, the illumination device according to the aforementioned respective embodiments has the only one diffraction optical element, but a plurality of the diffraction optical elements may be provided according to need. In particular, as described above, when the light source has a plurality of the laser light emission units, discrete diffraction optical elements may be provided correspondingly to these laser light emission units. In this case, even when the laser light emission units oscillate laser lights of different wavelength ranges, the respective diffraction optical elements can efficiently diffract laser lights of different wavelength ranges, which are generated by the corresponding laser lights.

When the illumination device includes a plurality of the diffraction optical elements, the optical-device drive unit may rotate the diffraction optical elements about one and the same rotation axis, or may rotate the diffraction optical elements about different rotation axes.

(4) Modification Example of Combination of Embodiments

As described above, the fourth embodiment shown in FIG. 11 is a combination of the third embodiment shown in FIG. 8 (which uses the rotation axis Rz) and the first embodiment shown in FIG. 1 (which uses the rotation axis Rx), and comprises the mechanism that rotates the diffraction optical element 420 about the rotation axis Rz, and rotates the same about the rotation axis Rx.

Although the fourth embodiment is for illustrating one of the combinations of the first to third embodiments, a combination example of the respective embodiments is not limited to this fourth embodiment, and the embodiments can be variously combined according to need. For example, it is possible to combine the first embodiment (which uses the rotation axis Rx) and the second embodiment (which uses the rotation axis Ry). In this case, it is possible to move a formation position of the projection pattern E in the vertical direction (Z axis direction) (to move the surface to be illuminated U in the vertical direction).

Of course, all the first to third embodiments can be combined. In addition, the fifth embodiment shown in FIG. 13 can be combined with the respective embodiments.

By combining these embodiments, degrees of freedom with which a position and an orientation of the projection pattern E on the surface to be illuminated U are changed can be greatly increased, so that the position and the orientation can be largely changed.

(6) Modification Example of Use

In the aforementioned embodiments, the illumination device according to the present invention is installed on a front grill of an automobile, but the use of the illumination device according to the present invention is of course not limited to the example in which the illumination device is installed on a front grill of an automobile. For example, the illumination device can be installed on a lighting unit of a general vehicle, in addition to an automobile. Alternatively, the illumination device can be located on a road surface and can be used in a stationary state.

(7) Other Modification Examples

In addition to the above, the present invention can be variously modified within basic concepts described below.

A first basic concept of the present invention resides in that an illumination device is composed of a light source, and a diffraction optical element that diffracts a light from the light source, and in that the diffraction optical element is supported such that the diffraction optical element is rotated in a plane not parallel to an optical axis of an incident light that is incident on the diffraction optical element. In this case, it is preferable that the light source has a light emission unit and a collimation lens, and that the collimation lens is disposed between the light emission unit and the diffraction optical element along an optical path from the light emission unit up to the diffraction optical element.

In addition, a second basic concept of the present invention resides in that an illumination device is composed of a light source, and a diffraction optical element that diffracts a light from the light source, that the diffraction optical element is operatively supported so that an orientation of an incident surface thereof is changed, and that the light source is operatively supported such that an angle between an optical axis of an incident light that is incident on the diffraction optical element and a normal line to an incident surface of the diffraction optical element is kept unchanged. In this case, the diffraction optical element may be rotatably supported about an axis line that is not parallel to the vertical direction, or may be rotatably supported about an axis line that is not parallel to the horizontal direction. In addition thereto, the diffraction optical element may be supported so as to be rotated in a plane that is not parallel to an optical axis of an incident light that is incident on the diffraction optical element. Also here, it is preferable that the light source has a light emission unit and a collimation lens, and that the collimation lens is disposed between the light emission unit and the diffraction optical element along an optical path from the light emission unit up to the diffraction optical element.

The illumination device according to the present invention can be widely used for projecting a desired projection pattern on a predetermined surface to be illuminated such as a road surface, a ground surface, a floor surface, a surface below water, and a wall surface. Moreover, since a projection position and/or a projection orientation of the projection pattern can be changed, the present invention is most suited for displaying a projection pattern, such as an arrow showing a traveling direction of a vehicle, on a road surface at a desired position in a desired orientation.
100: Illumination device according to first embodiment
110: Light source
111: Light emission unit
112: Optical shaping system
112a: Magnifying lens
112b: Collimation lens
120: Diffraction optical element (hologram)
130: Optical-element drive unit
131: Drive mechanism
132: Support arm
140: Device housing
200: Illumination device according to second embodiment
210: Light source
211: Light emission unit
212: Optical shaping system
212a: Magnifying lens
212b: Collimation lens
220: Diffraction optical element (hologram)
230: Optical-element drive unit
231: Drive mechanism
232: Support arm
240: Device housing
250: Light-source drive unit
251: Drive mechanism
252: Support arm
300: Illumination device according to third embodiment
310: Light source
311: Light emission unit
312: Optical shaping system
312a: Magnifying lens
312b: Collimation lens
320: Diffraction optical element (hologram)
  330: Optical-element drive unit
  331: Drive mechanism
  332: Support arm
  340: Device housing
  350: Light-source drive unit
  351: Drive mechanism
  352: Support arm
400: Illumination device according to fourth embodiment
410: Light source
411: Light emission unit
412: Optical shaping system
412a: Magnifying lens
412b: Collimation lens
420: Diffraction optical element (hologram)
430: Optical-element drive unit
431: Drive mechanism
432: Support arm
440: Device housing
450: Light-source drive unit
451: Drive mechanism
452: Support arm
500: Illumination device according to fifth embodiment
510: Light source
520: Diffraction optical element (hologram)
540: Device housing
550: Device-housing drive unit
560: Installation position
C: Optical axis of incident light
D: Direction showing orientation of projection pattern
D10: Standard direction of projection pattern
D11: First rotation direction of projection pattern
D12: Second rotation direction of projection pattern
E: Projection pattern E10: Standard pattern
E11: First rotation pattern
E12: Second rotation pattern
E20: Standard pattern
E21: First displacement pattern
E22: Second displacement pattern
E30: Standard pattern
E31: First rotation pattern
E32: Second rotation pattern
E40: Standard pattern
E41: First displacement pattern
E42: Second displacement pattern
e1, e2: Displacement amount of projection pattern
L: Parallel incident light
Ld: Diffracted light
L10, L20: Diffracted light in standard state
L11, L21: Diffracted light in first rotation state
L12, L22: Diffracted light in second rotation state
M1: Rotation direction of diffraction optical element
M2: Rotation direction of projection pattern
M3: Rotation direction of diffraction optical element
M4: Rotation direction of light emission unit
M5: Displacement direction of projection pattern
M6: Rotation direction of diffraction optical element
M7: Rotation direction of light emission unit
M8: Rotation direction of projection pattern
M9: Movement direction of projection pattern
N: Normal line to incident plane P2
N20: Normal line to incident surface P2 in standard state
N21: Normal line to incident surface P2 in a first rotation state
N22: Normal line to incident surface P2 in a second rotation state
N30: Normal line to incident surface P2 in standard state
N31: Normal line to incident surface P2 in a first rotation state
N32: Normal line to incident surface P2 in a second rotation state
O: Original point of XYZ three-dimensional orthogonal coordinate system
P1: Rotation plane
P2: Incident surface (light receiving surface)
P3: Emergent surface
Q1, Q2: Predetermine point on diffraction optical element
Q11 to Q62: Projection point
Rx: Rotation axis parallel to X axis
Ry: Rotation axis parallel to Y axis
Rz: Rotation axis parallel to Z axis
U: Surface to be illuminated
X: Coordinate axis of XYZ three-dimensional orthogonal coordinate system
Y: Coordinate axis of XYZ three-dimensional orthogonal coordinate system
Z: Coordinate axis of XYZ three-dimensional orthogonal coordinate system
+θ1: First rotation angle
−θ2: Second rotation angle
−φ1: First rotation angle
+φ2: Second rotation angle

What is claimed is:
1. An illumination device that projects a desired projection pattern on a surface to be illuminated, comprising:
a light source;
a diffraction optical element that diffracts a light from the light source and projects the projection pattern on the surface to be illuminated; and an optical-element drive unit that supports the diffraction optical element and drives the same;
wherein the optical-element drive unit determines a rotation axis which is orthogonal to a rotation plane including an incident surface of the diffraction optical element and which passes through an incident area in the incident surface, the light from the light source being incident on the incident area, and rotates the diffraction optical element about the rotation axis.

2. The illumination device according to claim 1, wherein the light source has a light emission unit that generates a light beam, and an optical shaping system that broadens the light beam to generate a parallel incident light, and causes the parallel incident light to be incident on the incident surface of the diffraction optical element.

3. The illumination device according to claim 2, wherein:
the diffraction optical element is disposed such that its incident surface is orthogonal to the parallel incident light; and
the optical-element drive unit rotates the diffraction optical element in the rotation plane including the incident surface.

4. The illumination device according to claim 2, wherein the optical shaping system has a magnifying lens that refracts and broadens the light beam generated by the light emission unit and a collimation lens that shapes the light from the magnifying lens into the parallel incident light, and causes the parallel incident light to be incident on the incident surface of the diffraction optical element.

5. The illumination device according to claim 1, wherein:
when an XYZ three-dimensional coordinate system having an X axis, a Y axis and a Z axis orthogonal to one another is defined;
the light source generates the parallel incident light parallel to the X axis, and causes the parallel incident light to be incident on the incident surface of the diffraction optical element;
the diffraction optical element is formed of a hologram recording medium disposed to be parallel to a YZ plane, the hologram recording medium recording an interference fringe for generating a reconstructed image serving as the projection pattern on the surface to be illuminated parallel to an XY plane; and
the optical-element drive unit rotates the diffraction optical element in the rotation plane parallel to the YZ plane.

6. The illumination device according to claim 1, further comprising a device housing that accommodates the light source, the diffraction optical element and the optical-element drive unit, and fixedly supports the light source and the optical-element drive unit.

7. An illumination device that projects a desired projection pattern on a surface to be illuminated, comprising:
a light source;
a diffraction optical element that diffracts a light from the light source and projects the projection pattern on the surface to be illuminated;
an optical-element drive unit that supports the diffraction optical element and drives the same; and
a light-source drive unit that supports the light source and drives the same;
wherein:
the optical-element drive unit changes an orientation of an incident surface of the diffraction optical element; and
the light-source drive unit changes, in accordance with the change in orientation of the incident surface, an orientation of the light from the light source.

8. The illumination device according to claim 7, wherein the light-source drive unit changes the orientation of the light from the light source, such that an angle between an optical axis of an incident light that is incident on the diffraction optical element and a normal line to the incident surface of the diffraction optical element is kept unchanged.

9. The illumination device according to claim 7, wherein the light source has a light emission unit that generates a light beam, and an optical shaping system that broadens the light beam to generate a parallel incident light, and causes the parallel incident light to be incident on the incident surface of the diffraction optical element.

10. The illumination device according to claim 9, wherein the optical-element drive unit determines a rotation axis orthogonal to the parallel incident light, and rotates the diffraction optical element about the rotation axis.

11. The illumination device according to claim 10, wherein a rotation axis is disposed at a position inside the diffraction optical element or at a position passing through a surface thereof.

12. The illumination device according to claim 7, further comprising a device housing that accommodates the light source, the diffraction optical element, the optical-element drive unit and the light-source drive unit, and fixedly supports the optical-element drive unit and the light-source drive unit.

13. The illumination device according to claim 7, wherein:
when a direction orthogonal to the surface to be illuminated is defined as a vertical direction;
the optical-element drive unit rotates the diffraction optical element such that a normal line that is normal to its incident surface is displaced in the vertical direction.

14. The illumination device according to claim 7, wherein:
when an XYZ three-dimensional coordinate system having an X axis, a Y axis and a Z axis orthogonal to one another is defined, and a state in which the incident surface of the diffraction optical element is disposed to be parallel to a YZ plane is defined as a standard state;
in the standard state, the light source generates a parallel incident light parallel to the X axis, and causes the parallel incident light to be incident on the incident surface;
the diffraction optical element is formed of a hologram recording medium, the hologram recording medium recording an interference fringe for generating a reconstructed image serving as the projection pattern on the surface to be illuminated parallel to an XY plane; and
the optical-element drive unit rotates the diffraction optical element about a rotation axis parallel to the Y axis.

15. The illumination device according to claim 14, wherein
the light-source drive unit changes an orientation of the light from the light source along a plane parallel to an XZ plane.

16. The illumination device according to claim 7, wherein when a direction parallel to the surface to be illuminated is defined as a horizontal direction, the optical-element drive unit rotates the diffraction optical element such that a normal line that is normal to its incident surface is displaced in the horizontal direction.

17. The illumination device according to claim 7, wherein:
- when an XYZ three-dimensional coordinate system having an X axis, a Y axis and a Z axis orthogonal to one another is defined, and a state in which the incident surface of the diffraction optical element is disposed to be parallel to a YZ plane is defined as a standard state;
- in the standard state, the light source generates a parallel incident light parallel to the X axis, and causes the parallel incident light to be incident on the incident surface;
- the diffraction optical element is formed of a hologram recording medium, the hologram recording medium recording an interference fringe for generating a reconstructed image serving as the projection pattern on the surface to be illuminated parallel to an XY plane; and
- the optical-element drive unit rotates the diffraction optical element about a rotation axis parallel to the Z axis.

18. The illumination device according to claim 17, wherein
- the light-source drive unit changes an orientation of the light from the light source along a plane parallel to the XY plane.

19. The illumination device according to claim 7, wherein
- the optical-element drive unit changes an orientation of the incident surface of the diffraction optical element, and the optical-element drive unit determines a rotation axis orthogonal to the rotation plane including the incident surface of the diffraction optical element, and rotates the diffraction optical element about the rotation axis.

20. An illumination device that projects a desired projection pattern on a surface to be illuminated, comprising:
- a light source;
- a diffraction optical element that diffracts a light from the light source and projects the projection pattern on the surface to be illuminated;
- a device housing that accommodates the light source and the diffraction optical element; and
- a device-housing drive unit that installs the device housing at a predetermined installation position, and drives the device housing such that a position or an orientation, or both of the device housing with respect to the installation location is/are changed.

* * * * *